(12) United States Patent
Hashimoto et al.

(10) Patent No.: US 7,989,997 B2
(45) Date of Patent: Aug. 2, 2011

(54) CONTROL DEVICE FOR ELECTRICALLY OPERATED POWER STEERING SYSTEM

(75) Inventors: Manabu Hashimoto, Hitachinaka (JP); Akira Mishima, Mito (JP); Kentaro Ochi, Hitachi (JP); Takuro Kanazawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 12/473,662

(22) Filed: May 28, 2009

(65) Prior Publication Data

US 2010/0052449 A1 Mar. 4, 2010

(30) Foreign Application Priority Data

Sep. 2, 2008 (JP) ................................. 2008-225162

(51) Int. Cl.
*H02K 11/00* (2006.01)
(52) U.S. Cl. ..................................... 310/68 D; 310/68 R
(58) Field of Classification Search ................ 310/68 R, 310/68 D, 71
See application file for complete search history.

(56) References Cited

U.S. PATENT DOCUMENTS

| | | | | |
|---|---|---|---|---|
| 5,732,790 A * | 3/1998 | Endo et al. | | 180/444 |
| 6,166,464 A * | 12/2000 | Grant | | 310/68 R |
| 6,441,520 B1 * | 8/2002 | Grant | | 310/68 R |
| 6,906,483 B2 * | 6/2005 | Tominaga et al. | | 318/293 |
| 7,312,545 B2 * | 12/2007 | Sasaki et al. | | 310/68 R |
| 7,723,878 B2 * | 5/2010 | Yagai et al. | | 310/71 |
| 2003/0127921 A1 | 7/2003 | Akutsu et al. | | |
| 2003/0173920 A1 | 9/2003 | Tominaga et al. | | |
| 2003/0230942 A1 | 12/2003 | Okubo et al. | | |
| 2005/0167183 A1 | 8/2005 | Tominaga et al. | | |
| 2006/0006749 A1 * | 1/2006 | Sasaki et al. | | 310/68 R |
| 2006/0138883 A1 * | 6/2006 | Yagai et al. | | 310/71 |
| 2007/0045037 A1 | 3/2007 | Yoshinari et al. | | |
| 2007/0205038 A1 | 9/2007 | Tominaga et al. | | |

FOREIGN PATENT DOCUMENTS

| | | |
|---|---|---|
| EP | 1 747 971 A1 | 1/2007 |
| EP | 1 920 992 A1 | 5/2008 |
| JP | 2003-267233 A | 9/2003 |
| JP | 2005-304203 A | 10/2005 |
| JP | 2007-30652 A | 2/2007 |

OTHER PUBLICATIONS

European Search Report dated Nov. 22, 2010 (six (6) pages).

* cited by examiner

*Primary Examiner* — Thanh Lam
(74) *Attorney, Agent, or Firm* — Crowell & Moring LLP

(57) ABSTRACT

A control device for an electrically operated power steering system includes: a power substrate comprising a plurality of switching elements, that converts DC electrical current to AC electrical current by switching operation of the plurality of switching elements; an output terminal for transmitting the AC electrical current to an electric motor that generates steering torque; a conductor for electrically connecting the power substrate to the output terminal; a metallic chassis that holds the power substrate and the conductor, and supports the output terminal; and a metallic cover that faces the output terminal, and that is connected to the metallic chassis.

15 Claims, 19 Drawing Sheets

CONTROL DEVICE FOR ELECTRICALLY OPERATED POWER STEERING SYSTEM

INCORPORATION BY REFERENCE

The disclosure of the following priority application is herein incorporated by reference: Japanese Patent Application No. 2008-225162, filed Sep. 2, 2008.

BACKGROUND OF THE INVENTION

1. Field of the Invention

The present invention relates to a control device for an electrically operated power steering system.

2. Description of Related Art

In order to allow a control device and a motor for an electrically operated power steering system for a vehicle to be mounted in flexible positions in the vehicle, according to the type of vehicle, there is a desire to make them more compact. An electrically operated power steering device for responding to this demand, in which a drive motor and a control device for the electrically operated power steering system for a vehicle are integrated together, has been proposed in Japanese Laid-Open Patent Publication 2007-30652.

SUMMARY OF THE INVENTION

However, since this electrically operated power steering system control device described in Japanese Laid-Open Patent Publication 2007-30652 merely integrates together the motor and the control device for the electrically operated power steering system, it accordingly provides no teaching for making the control device for the electrically operated power steering system, itself, more compact. Therefore no sufficient response is provided to demands for making the control device more compact in order to provide flexibility in the position in which it is mounted in a vehicle, according to the type of vehicle. Moreover, in this proposal, no countermeasures are implemented for sufficiently reducing the amount of noise radiation from this control device for an electrically operated power steering system.

According to the 1st aspect of the present invention, a control device for an electrically operated power steering system, comprises: a power substrate comprising a plurality of switching elements, that converts DC electrical current to AC electrical current by switching operation of the plurality of switching elements; an output terminal for transmitting the AC electrical current to an electric motor that generates steering torque; a conductor for electrically connecting the power substrate to the output terminal; a metallic chassis that holds the power substrate and the conductor, and supports the output terminal; and a metallic cover that faces the output terminal, and that is connected to the metallic chassis.

According to the 2nd aspect of the present invention, in the control device for an electrically operated power steering system according to the 1st aspect, it is preferred that: the output terminal is connected by a screw to a terminal of the electric motor; and the metallic cover is supported so as to face the output terminal and the screw.

According to the 3rd aspect of the present invention, in the control device for an electrically operated power steering system according to the 1st or the 2nd aspect, it is preferred that: the metallic chassis comprises a metallic support portion, for integrally supporting an electric motor side metallic chassis that houses the electric motor; and the metallic support portion is formed at a side portion of a connection portion between the metallic cover and the metallic chassis.

According to the 4th aspect of the present invention, in the control device for an electrically operated power steering system according to any one of the 1st through 3rd aspects, it is preferred that: the control device further comprises a heat dissipation member that is provided upon a one surface of the power substrate opposite from another surface of the power substrate upon which the switching elements are provided; and the heat dissipation member is provided with heat dissipation fins on an opposite side to a side that contacts the power substrate.

According to the 5th aspect of the present invention, in the control device for an electrically operated power steering system according to any one of the 1st through 4th aspects, it is preferred that: the control device further comprises a DC current system conductor unit to which DC electrical current is supplied from a power supply, and that supplies the DC electrical current to the switching elements; and the DC current system conductor unit is provided at a side portion of the power substrate.

According to the 6th aspect of the present invention, in the control device for an electrically operated power steering system according to the 5th aspect, it is preferred that the DC current system conductor unit is provided at a side portion of the power substrate and on the heat dissipation member.

According to the 7th aspect of the present invention, in the control device for an electrically operated power steering system according to the 5th aspect, it is preferred that the DC current system conductor unit is provided at a side opposite from the metallic support portion, with the power substrate placing between the DC current system conductor unit and the metallic support portion.

According to the 8th aspect of the present invention, in the control device for an electrically operated power steering system according to the 6th aspect, it is preferred that the DC current system conductor unit comprises a first connector for connecting to a battery power supply on a one surface of the DC current system conductor unit opposite from another surface of the DC current system conductor unit that contacts the heat dissipation member.

According to the 9th aspect of the present invention, in the control device for an electrically operated power steering system according to the 8th aspect, it is preferred that the first connector of the DC current system conductor unit is provided more to an exterior than an end portion of the electric motor in its axial direction.

According to the 10th aspect of the present invention, in the control device for an electrically operated power steering system according to any one of the 1 through 9th aspects, it is preferred that: the control device further comprises a control board that transmits control signals to the switching elements and controls switching of the switching elements; and the control board is provided so as to be positioned between the power substrate and the electric motor supported thereat, and is provided so that at least one portion thereof overlaps the DC current system conductor unit.

According to the 11th aspect of the present invention, in the control device for an electrically operated power steering system according to the 10th aspect, it is preferred that the control board comprises, on a surface towards the electric motor, a second connector that inputs and outputs signals from and to the exterior of the control device for an electrically operated power steering system.

According to the 12th aspect of the present invention, in the control device for an electrically operated power steering system according to the 11th aspect, it is preferred that the second connector of the control board is provided more towards the exterior than an end portion of the electric motor in its axial direction.

According to the 13th aspect of the present invention, in the control device for an electrically operated power steering system according to the 5th aspect, it is preferred that: the DC current system conductor unit comprises an electrolytic capacitor for smoothing DC electrical current from the power supply, and a plate shaped conductor that is connected to the electrolytic capacitor; and a plate shaped conductor through which electrical current on a positive electrode side of the electrolytic capacitor flows, and a plate shaped conductor through which electrical current on a negative electrode side of the electrolytic capacitor flows, are provided so as to be overlapped over one another.

According to the 14th aspect of the present invention, in the control device for an electrically operated power steering system according to the 13th aspect, it is preferred that: when the electrolytic capacitor and the plate shaped conductor are connected together, a terminal of the electrolytic capacitor and a projecting portion of the plate shaped conductor are connected together; and the terminal of the electrolytic capacitor and the projecting portion of the plate shaped conductor are provided so as to be overlapped over one another, and are connected so that directions of electrical currents that flow therein are mutually opposite.

According to the 15th aspect of the present invention, in the control device for an electrically operated power steering system according to the 5th aspect, it is preferred that: the DC current system conductor unit further comprises an electrolytic capacitor for smoothing the DC electrical current from the power supply; the electrolytic capacitor is formed in a cylindrical shape; and a central cylindrical axis of the electrolytic capacitor and an axial direction of the electric motor agree with one another, and the electrolytic capacitor is provided so that a cylindrical end portion thereof upon which positive and negative terminals are provided is positioned towards the power substrate.

DESCRIPTION OF THE PREFERRED EMBODIMENTS

Figure 9:
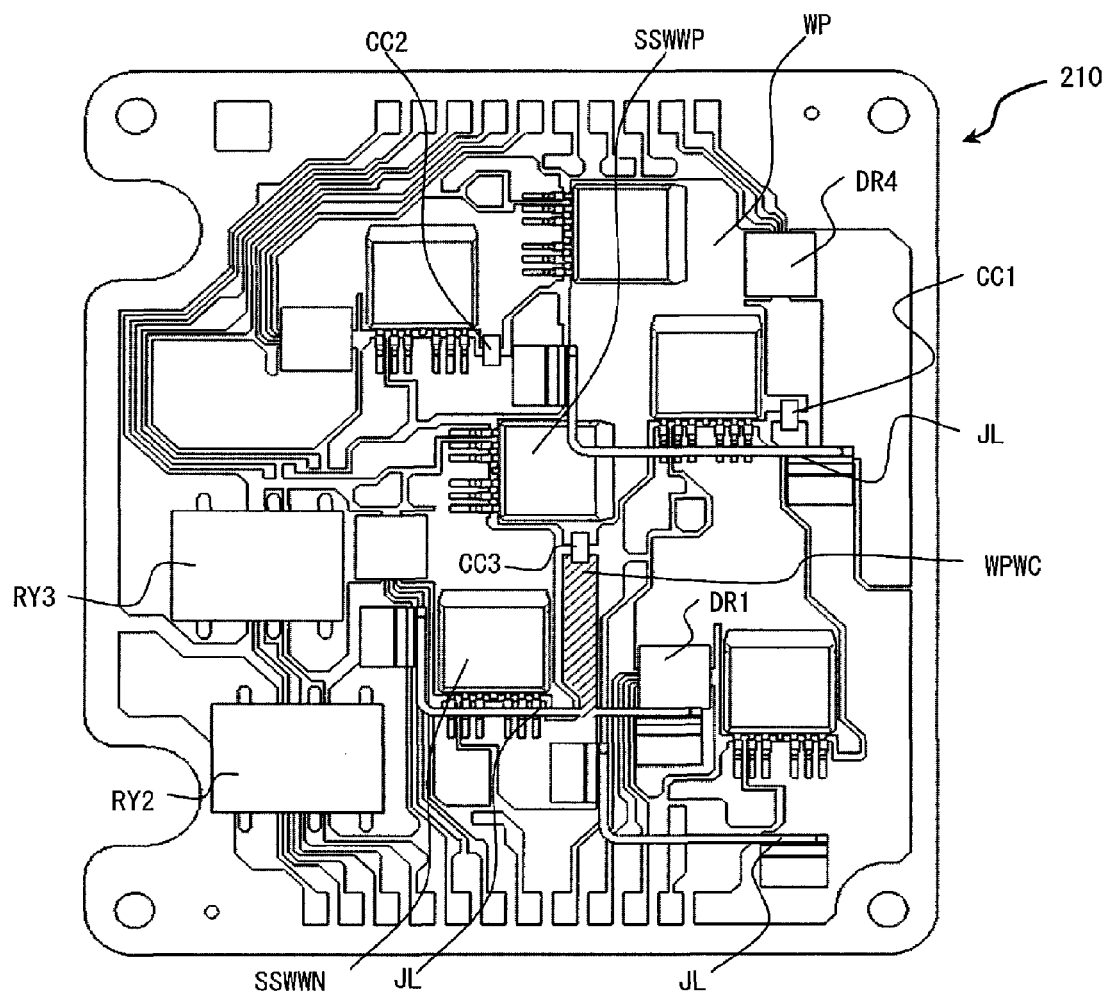
FIG. 9 is a plan view showing the layout of a wiring pattern of the power module of the control device for an electrically operated power steering system according to an embodiment of the present invention.
Figure 10:
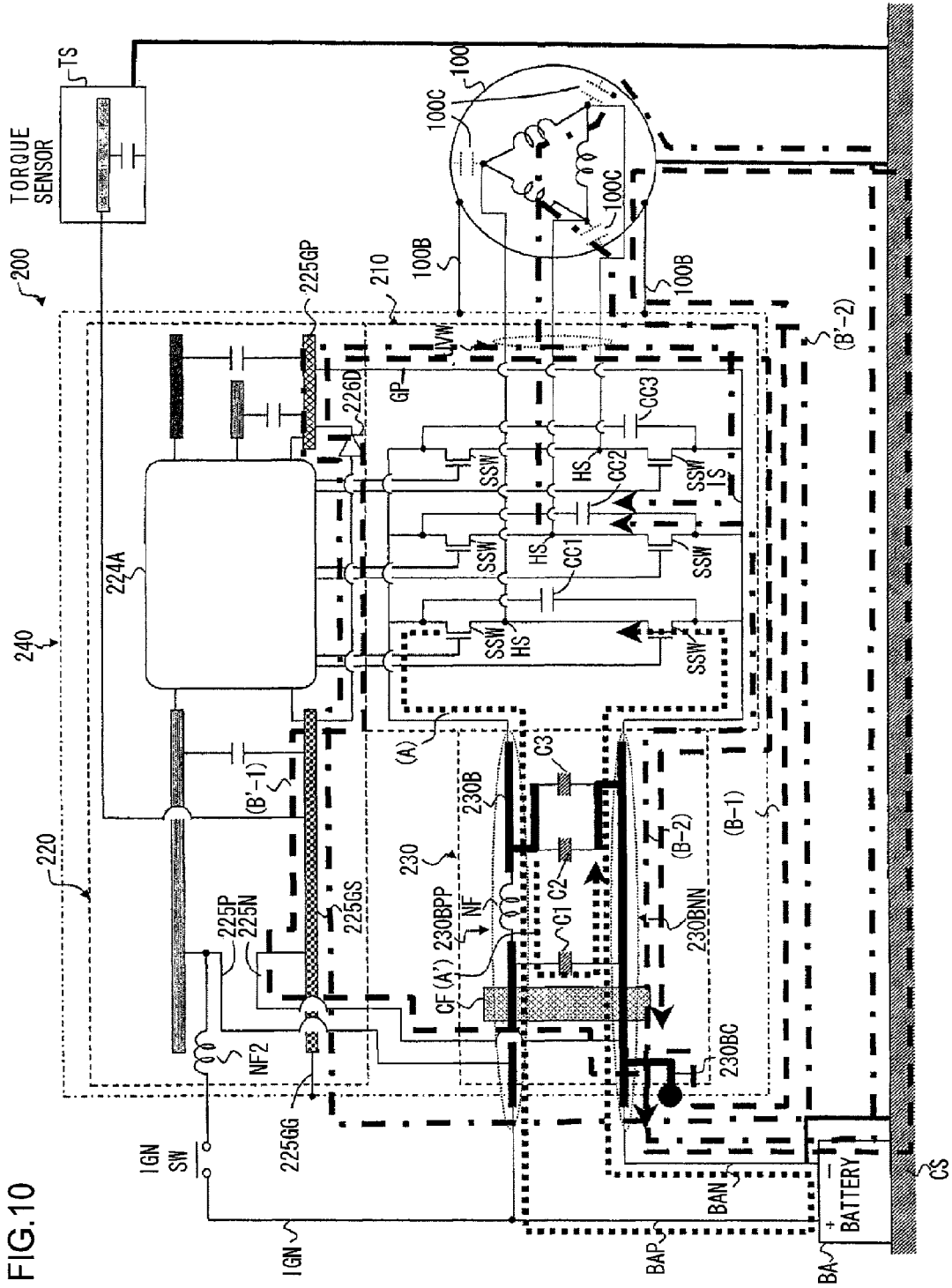
FIG. 10 is a circuit diagram showing the circuit structure of the control device for an electrically operated power steering system according to an embodiment of the present invention.
Figure 11:
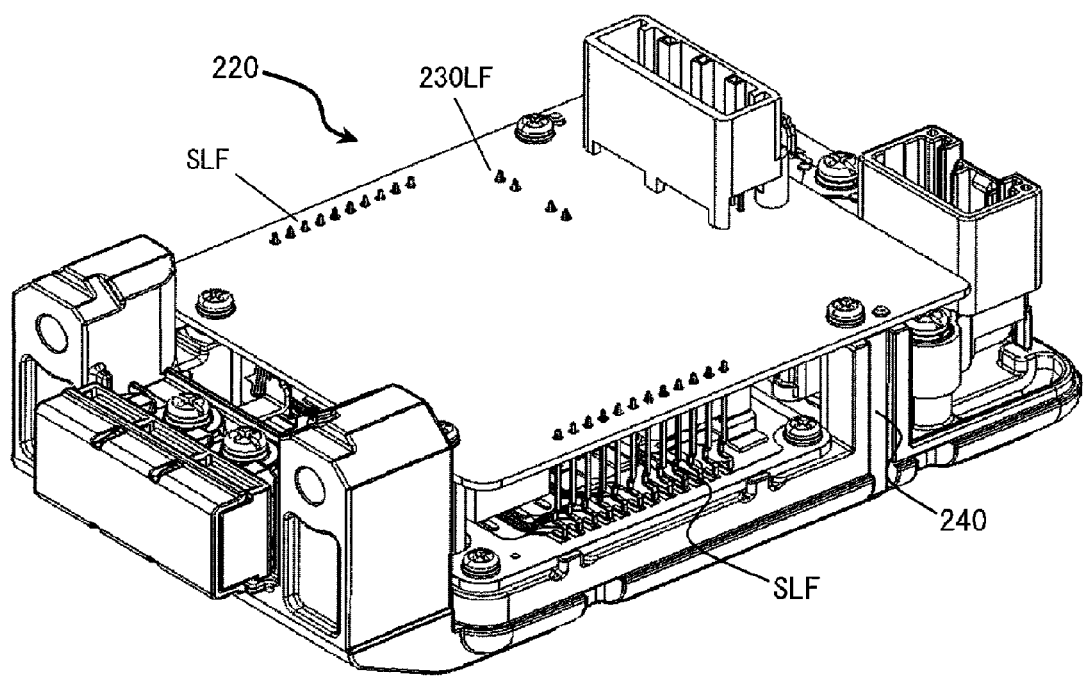
FIG. 11 is a perspective view showing the assembly construction, where the control module and the lead frame of the control device for an electrically operated power steering system according to an embodiment of the present invention are connected together.
Figure 12:
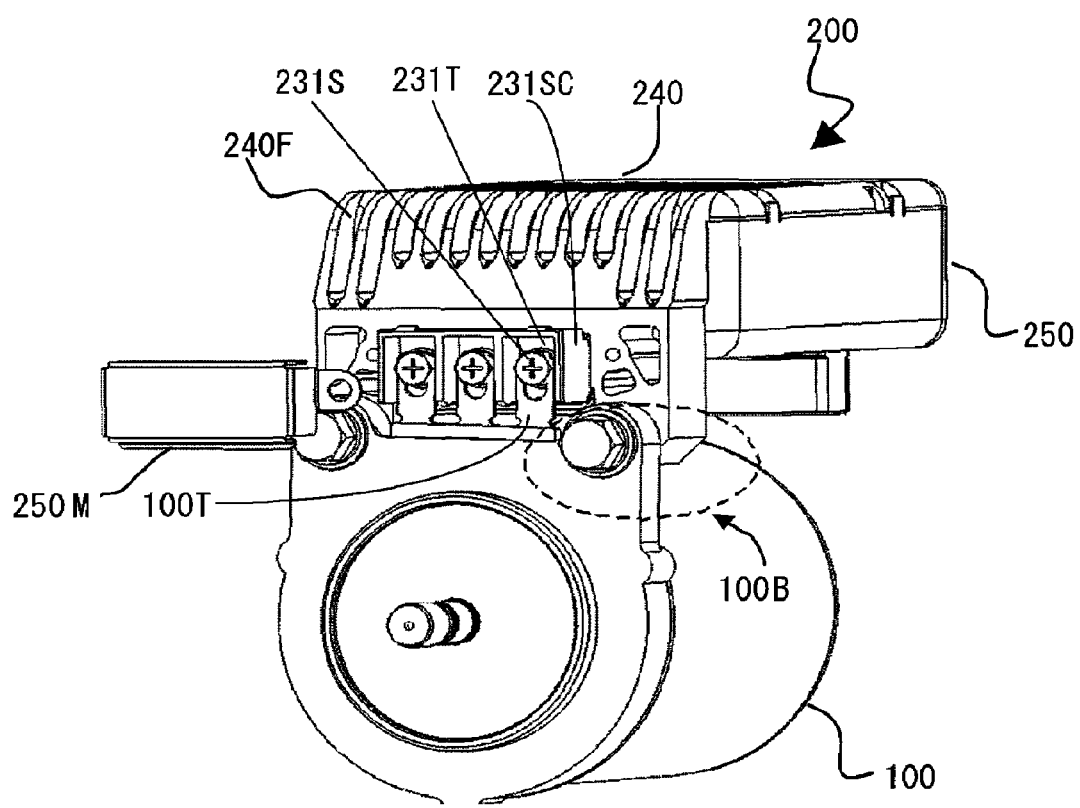
FIG. 12 is a perspective view showing the motor control device and the motor of this control device for an electrically operated power steering system according to an embodiment of the present invention.
Figure 13:
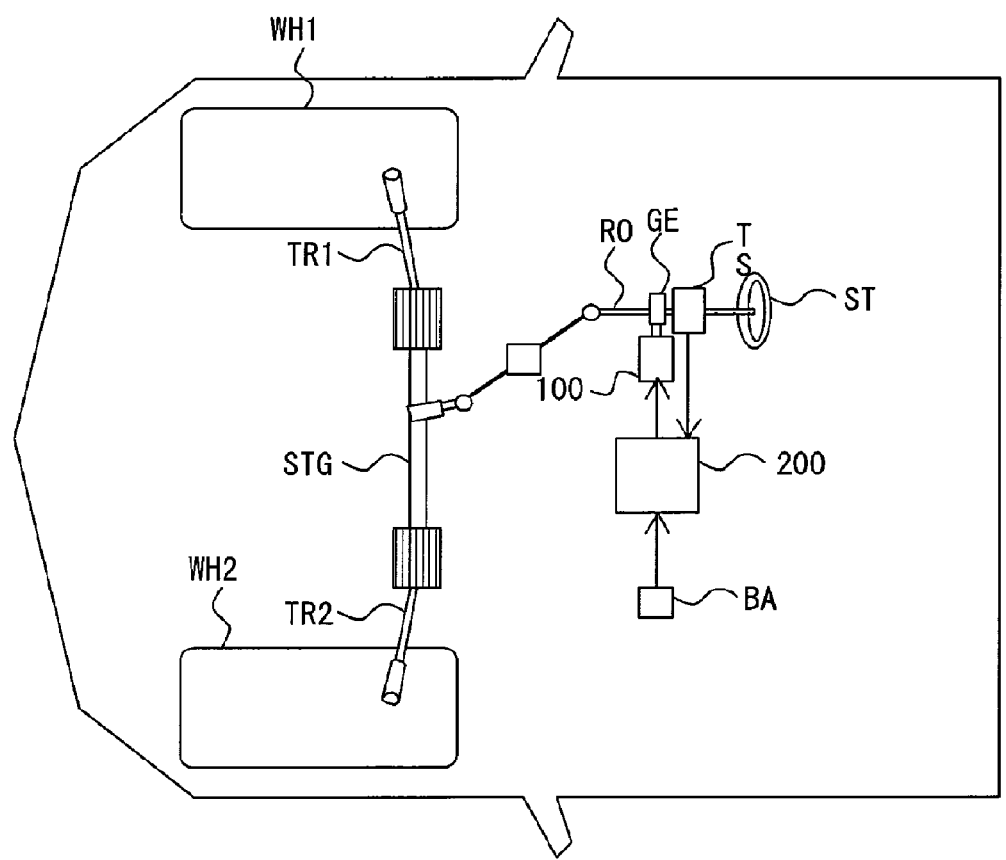
FIG. 13 is a schematic system diagram showing the structure of an electrically operated power steering system that employs this electrically operated power steering system according to an embodiment of the present invention.

In the following, a control device for an electrically operated power steering system according to an embodiment of the present invention, and an electrically operated power steering device, will be explained using FIGS. 1 through 15. FIGS. 1 through 10, 14, and 15 are figures for explanation of the construction and the operation of this control device for an electrically operated power steering system that controls the driving of a motor; FIG. 11 is a figure for explanation of the assembly of this control device for an electrically operated power steering system; FIG. 12 is a figure showing the way in which this control device for an electrically operated power steering system is mounted to a motor; and FIG. 13 is a figure for explanation of the electrically operated power steering system.

Overall Explanation of the ECU (in Exploded Perspective View)

Figure 1:
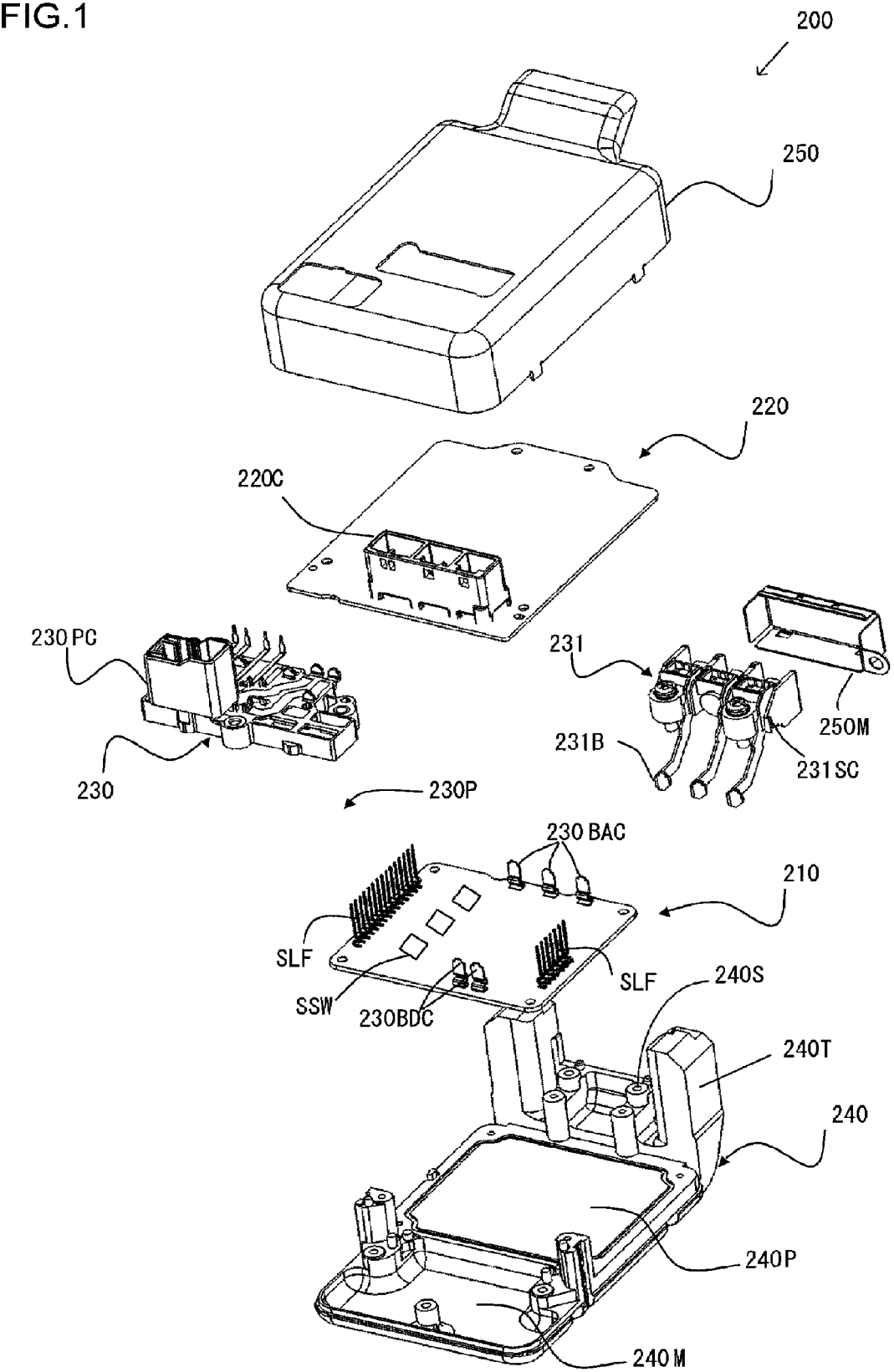
FIG. 1 is an exploded perspective view showing the construction of a control device for an electrically operated power steering system according to an embodiment of the present invention.

First, the overall construction of the control device for an electrically operated power steering according to this embodiment will be explained using FIG. 1. FIG. 1 is an exploded perspective view showing the construction of this control device for an electrically operated power steering system according to an embodiment of the present invention.

As shown in FIG. 1, this control device for an electrically operated power steering system (hereinafter also sometimes termed a "motor control device") includes a DC conductor module 230, an AC conductor module 231, a power module 210, a control module 220, a cover 250, and a metallic chassis 240.

In the DC conductor module 230, a power supply connector 230PC via which electrical power is supplied from a battery BA (refer to FIG. 4) and a frame for leads 230LF (refer to FIG. 5) that constitute signal lines are molded from resin and are integrally fixed together; and this module 230 also includes bus-bars 230B (i.e. a plate-shaped conductors) that constitute electrical power supply lines (230BPP and 230BNN in FIGS. 4 and 6), with these bus-bars 230B being integrally fixed to the power supply connector 230PC. Furthermore, to the DC conductor module 230, there are fitted filter elements such as a normal filter NF and an electrolytic capacitor C1 or the like, a relay RY1 for circuit protection, and electrolytic capacitors C2 and C3 that provide driving electrical power for a motor 100 (refer to FIGS. 5 and 6). These elements and the bus-bars 230B are fixed together by TIG welding (arc welding). Further details of this DC conductor module 230 will be described hereinafter.

In the AC conductor module 231, bus-bars 231B that constitute electrical power lines are integrally formed with a motor terminal block 231SC that supply electrical power to the motor 100. The motor terminal block 231SC is fixed with screws to terminal support portions 240S that are provided upon the metallic chassis 240.

In the power module 210, a wiring pattern is formed upon an insulation layer that is laid upon the metallic base, and inverters that include semiconductor switching elements SSW such as MOSFETs or the like and resistors and so on are fixed upon this wiring pattern. To this power module 210 there are provided terminals for signals, terminals for input of DC power, and terminals for output of AC power, to which a plurality of lead frames for signals SLF and power lead frames 230BDC (230BP and 230BN in FIG. 4) and 230BAC (230BU, 230BV, and 230BW in FIG. 4) are attached by one end of each of these lead frames being fixed thereto with solder.

The signal lead frames SLF are used for electrically connecting together the power module 210 and the control module 220. And the power lead frames 230BDC and 230BAC are used for electrically connecting together, respectively, the power module 210 and the bus-bars 230B of the DC conductor module 230, and the power module 210 and the bus-bars 231B of the AC conductor module 231.

In the control module 220, a CPU and custom ICs such as ASICs or the like that integrate a plurality of functions, such as voltage elevation circuits and so on, are fitted upon a printed circuit board. In the state shown in FIG. 1, the CPU and the custom ICs (ASICs) and so on are fitted upon the downward facing side of the board. Moreover, a signal connector 220C is fitted to this control module 220. A connector for cables for connection to an external engine control unit ECU or the like, or to a CAN or the like, is inserted into this signal connector 220C.

The metallic chassis 240 includes a heat dissipation surface 240P for mounting of the power module 210, a module implementation surface 240M whose thickness is somewhat less than that of the heat dissipation surface 240P, and struts 240T. The heat that is generated by the power module 210 is conducted to the metallic chassis 240 via the heat dissipation surface 240P that is in contact with the lower surface of the power module 210, and is thereby dissipated. The metallic chassis 240 therefore functions as a heat sink.

The DC conductor module 230, that has large sized elements such as the electrolytic capacitors C2 and C3 and the relay RY1 and the like, is mounted and protected upon the module implementation surface 240M, and this reduces the length of the motor control device 200 in the height direction. The struts 240T are fixing portions (support portions) that mechanically and electrically connect together the motor control device 200 and the motor 100 (refer to FIG. 2) via screws or the like, and that moreover constitute heat transmission paths for dissipating heat from the metallic chassis 240 via the motor 100 to the vehicle to which this system is mounted.

The cover 250 and the metallic chassis 240 are made from aluminum. It should be understood that while, from the point of view of noise reduction, it is desirable for the cover 250 to be made from a metal such as aluminum or the like, it could also be made from resin.

During assembly, the power module 210 is fitted to the metallic chassis 240 with screws. Next, the DC conductor module 230 is put upon the module implementation surface 240M, i.e. beside the power module 210, and is fitted to the metallic chassis 240 with screws. Then, on the opposite side from the DC conductor module 230, the AC conductor module 231 is fitted to the metallic chassis 240 with screws. Moreover, the other ends of the power lead frames 230BDC and 230BAC are TIG welded to the bus-bars of the DC conductor module 230 and the AC conductor module 231.

Next, the control module 220 is arranged above the power module 210, the DC conductor module 230, and the AC conductor module 231, and is fitted to the metallic chassis 240 by screws, in the same manner. And the other ends of the lead frames for signals SLF are fixed with solder to the terminals of the control module 220. Finally, the manufacture of the motor control device is completed by fixing the cover 250 to the metallic chassis 240 by swaging.

Figure 2:
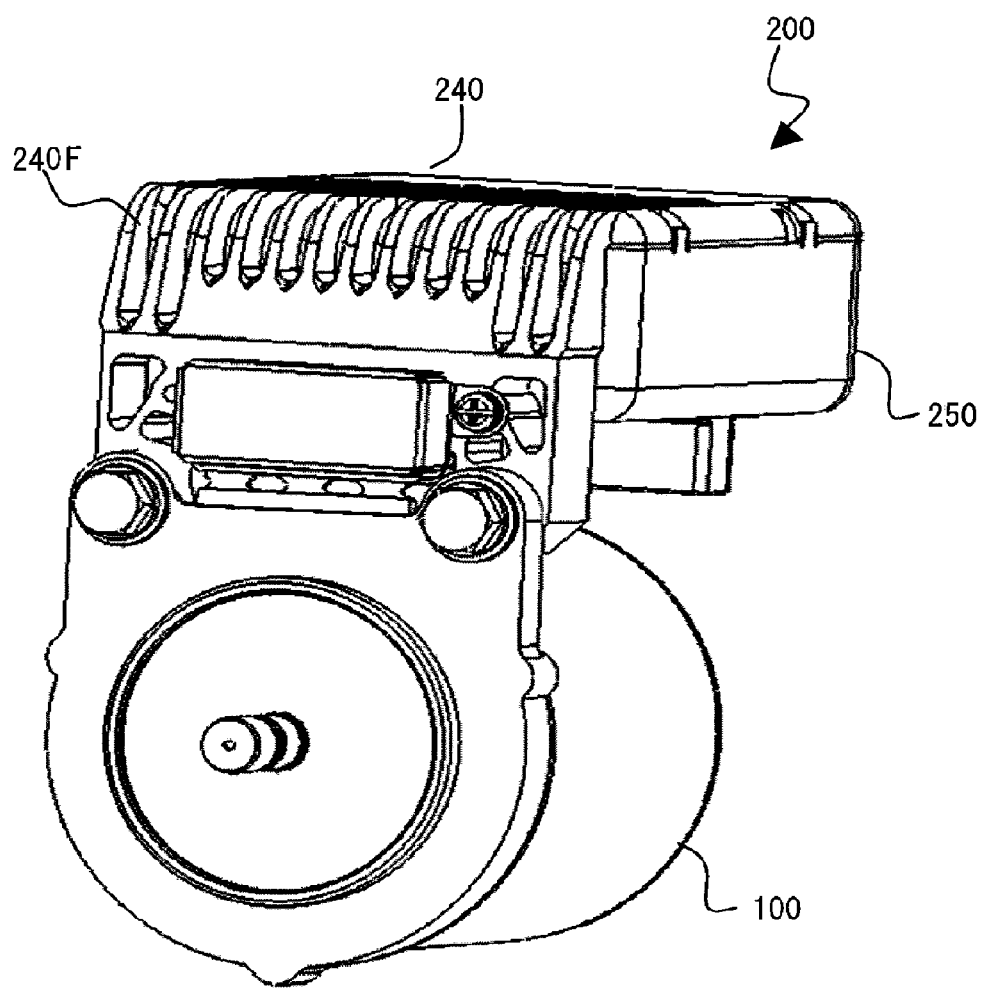
FIG. 2 is a perspective view showing a motor control device 200 in an inverted vertical orientation, and showing how it is connected to a motor 100.

FIG. 2 is a perspective view showing the motor control device 200 shown in FIG. 1 with its vertical orientation reversed, and showing it as connected to the motor 100. Heat dissipation fins 240F (hereinafter simply termed "fins") are formed upon the opposite surface of the metallic chassis 240 to its surface upon which the power module 210 shown in FIG. 1 is constructed. These fins 240F, along with enhancing the heat dissipation performance of the metallic chassis 240, also serve to lighten the motor control device 200.

Figure 3:
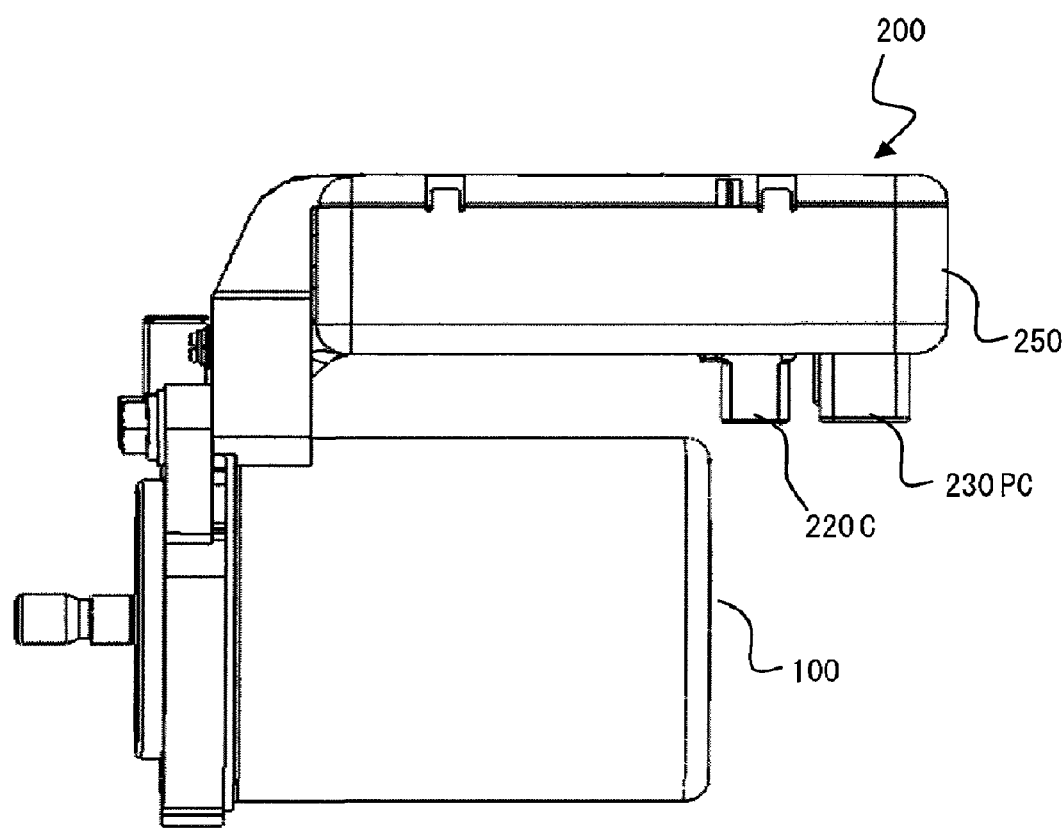
FIG. 3 is a side view of the motor control device 200 and the motor showing the positional relationship between them.

FIG. 3 is a figure showing the positional relationship of the motor control device 200 and the motor 100 shown in FIG. 2 as seen in the horizontal direction. The power supply connector 230PC and the signal connector 220C protrude at positions behind the rear portion of the motor 100 as seen in the figure, and thus it is possibly effectively to utilize the space behind the rear portion of the motor 100 as a wiring space for cabling or the like. In other words, the power supply connector 230PC and the signal connector 220C are provided more to the exterior than the end portion of the motor 100 in its axial direction. Moreover, by the control device 200 being brought close to the motor 100 in this manner, it is possible to utilize this space, that includes not only wiring but also connector portions, in an effective manner.

By thus constructing the power supply connector 230PC and the signal connector 220C in this manner as seen in the figures, it is possible to utilize the free space at the rear portion of the motor in an efficient manner, and thus it is possible to make this electrically operated power steering device, and the space for installing this electrically operated power steering device, more compact. Moreover, as a whole, no connectors protrude outwards from the motor control device 200, so that it is possible to ensure that it is more compact and its external appearance is neater. Yet further, since the power supply connector 230EC and the signal connector 220C are provided more to the exterior than the end portion of the motor 100 in its axial direction, accordingly it is possible to insert connectors for cables from the battery BA, or connectors or the like for cables for control signals from the exterior of the motor control device 200 into these connectors while safeguarding the operability, since these components constitute no impediment to the motor 100.

Overall Explanation of the ECU (Structural Circuit Diagram)

Figure 4:
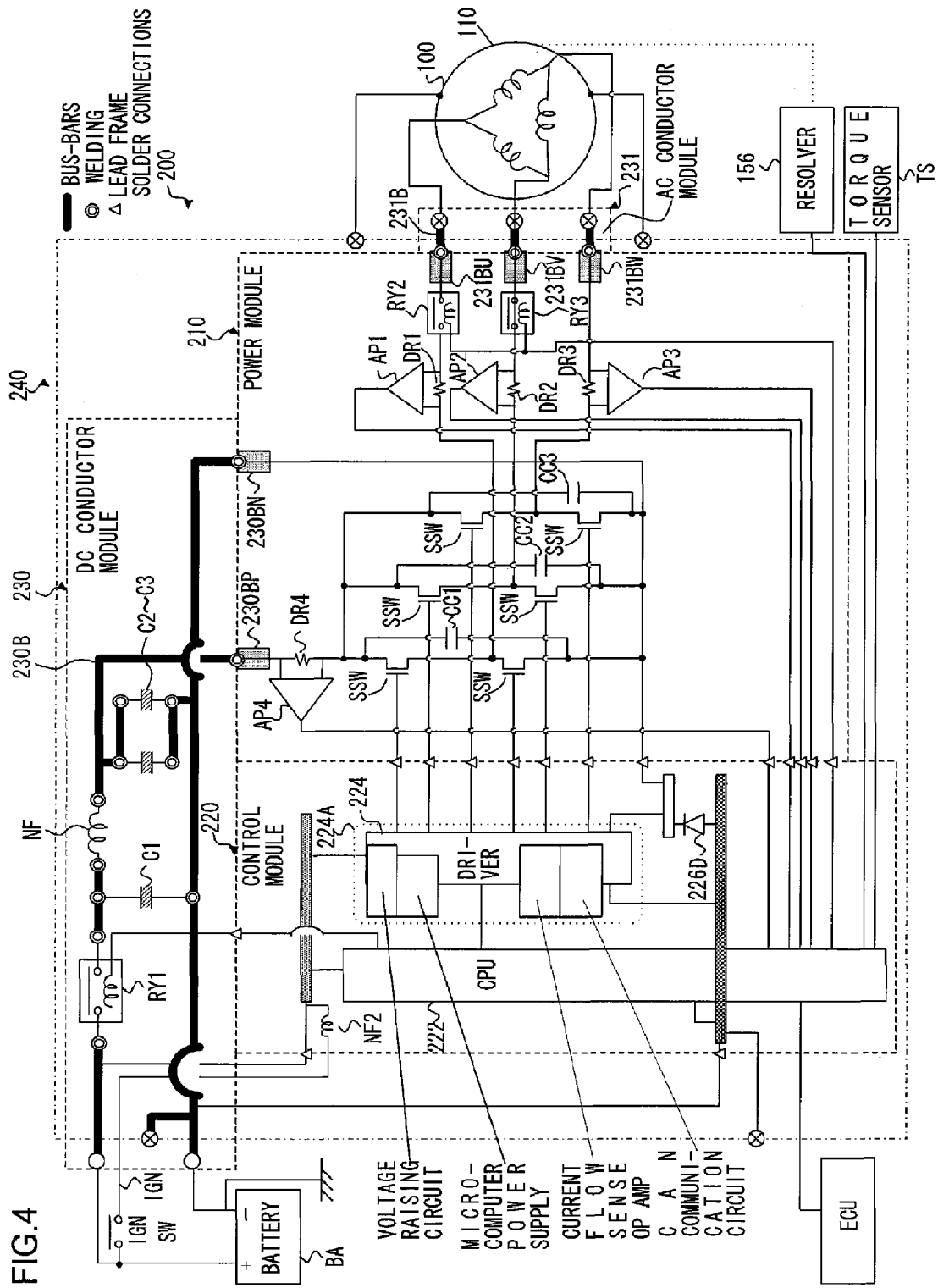
FIG. 4 is a circuit diagram of the control device for an electrically operated power steering system according to an embodiment of the present invention.

FIG. 4 is a circuit diagram showing the circuit structure of this control device for an electrically operated power steering system according to an embodiment of the present invention. It should be understood that to portions that are the same as ones shown in FIG. 1, the same reference symbols are appended.

This motor control device includes the power module 210, the control module 220, the DC conductor module 230, and the AC conductor module 231.

In the DC conductor module 230 the bus-bars 230B, that constitute electrical power lines, are formed integrally by resin molding. The portions shown by thick solid lines in the figure denote these bus-bars. In this DC conductor module 230, a normal filter (coil) NF, the electrolytic capacitors C1, C2, and C3, and the relay RY1 are connected to the battery BA that constitutes the power supply, and moreover are connected, as shown in the figure, via the power lead frames 230BP and 230BN to bus-bars, in other words to plate shaped conductors, that connect to the drain terminals or the source terminals of semiconductor switching elements SSW of the power module 210 such as MOSFETs or the like.

The relay RY1 is for protecting the system from excessive power supply electrical current, and cuts out in an excessive current situation. This relay RY1 is fitted more towards the battery BA than the electrolytic capacitors C1, C2, and C3, and is for preventing sudden surging of current into these electrolytic capacitors. In other words, by fitting the electrolytic capacitors C1, C2, and C3 are fitted to the DC conductor module 230, it is ensured that they do not receive excessive heat from the power module 210, so that they are assured of longer working lives.

The electrolytic capacitors C2 and C3, along with storing electrical current supplied from the battery BA, also function as smoothing capacitors that supply electrical power to the motor 100 according to the switching operation of the semiconductor switching elements SSW. The normal filter NF and the capacitor C1 constitute filters, and suppress the emission and entry of noise, and in particular, the influence of voltage pulsations upon the power supply line due to the operation of the semiconductor switching elements SSW, thus fulfilling the function of reducing the influence of radio noise. The arrangements related to structures for reduction of radio noise will be described hereinafter with reference to FIG. 10. Moreover, ceramic capacitors CC1, CC2, and CC3 fulfill the function of suppressing spike noise from the semiconductor switching elements SSW, and of absorbing surge voltages from the semiconductor switching elements SSW. The arrangements related to structures for reduction of spike noise will be described hereinafter with reference to FIG. 9.

Moreover, in FIG. 4, the double-circle marks indicate spots at which connections are made by TIG welding. For example, the two terminals of the normal filter NF are connected to the terminals of the bus-bars by TIG welding. And the two terminals of each of the electrolytic capacitors C1, C2, and C3, the two terminals of the relay RY1, and the terminals of the power lead frames 230BP and 230BN on the DC conductor module 230 side are also connected to the bus-bar terminals by welding.

Furthermore, in FIG. 4, the circle-with-X marks indicate spots fixed by screw fastenings. For example, the bus-bar 230B that is connected to the negative side cable from the battery BA is electrically connected to the metallic chassis 240 of the motor control device 200 by a screw fastener.

In the AC conductor 231 the bus-bars 231B, that constitute electrical power lines for supplying electrical current to the motor 100, are formed integrally by resin molding. This AC conductor module 231 is connected to the power module 210 via the power lead frames 231BU, 231BV, and 230BW, as shown in the figure. Moreover, as with the DC conductor module 230, the terminals of the power lead frames 231BU, 231BV, and 231BW on the AC conductor module 231 side are also connected to their corresponding bus-bar terminals by welding. Furthermore, the circle-with-X marks indicate spots fixed by screw fastenings; thus, the bus-bars 231B are connected to the three phase electrical power lines for the motor 100 by screws. Yet further, a metallic chassis 110 of the motor and the metallic chassis 240 of the motor control device 200 are also connected together by screws.

The control module 220 includes a CPU 222 and a driver circuit 224. The CPU 222 controls the semiconductor switching elements SSW of the power module 210 on the basis of the torque as detected by the torque sensor TS, and of the rotational position of the motor 100 as detected by a resolver 156. In other words, the CPU 222 outputs a control signal to the driver circuit 224 that controls continuity or interception of these switching elements SSW. And the driver circuit 224 controls the semiconductor switching elements SSW of the power module 210 on the basis of this control signal that is supplied from the CPU 222.

The motor electrical currents that are supplied from the power module 210 to the motor 100 are detected by resistors (shunt resistors) DR1, DR2, and DR3 that constitute motor electrical current detection elements, and the values thereof are inputted to the CPU 222 after having been amplified by respective amplifiers AP1, AP2, and AP3. And the CPU 222 performs feedback control so as to make the motor electrical current attain a target value. Moreover, the total current of all phases supplied to the motor 100 is detected by a resistor (a shunt resistor) DR4 that constitutes a detection element, and the value thereof is inputted to the CPU 222 after having been amplified by an amplifier AP4.

The CPU 222 is connected to an external engine control unit ECU or the like by a CAN or the like, and these units are adapted to transfer information between them. Moreover, the control module 220 is made more compact by a custom IC (an ASIC) that includes the driver circuit 224 integrating together, in a single IC, the functions of a voltage raising circuit, a microcomputer power supply circuit, an electrical current sense amp, a CAN communication circuit, and so on.

In FIG. 4, the Δ (triangle) marks indicate spots at which connections are made to the lead frames using solder. With the structure of the present invention, it is arranged to mitigate the stresses that are generated at the soldered portions when using lead frames. The shapes of the lead frames and so on will be described subsequently with reference to FIG. 9. It should be understood that soldered connections using lead frames are employed at the electrical connection portions between the control module 220, and the power module 210 and the conductor module 230.

The power module 210 includes the six semiconductor switching elements SSW, such as MOSFETs or the like. For each of the three phases (the U phase, the V phase, and the W phase), the semiconductor switching elements SSW are connected in series as an upper arm and a lower arm. Here, the power lead frames 230BP, 230BN, 231BU, 231BV, and 231BW are electrically connected to the power module 210 by soldering. In other words, while the motor electrical current is supplied from the DC conductor module 230 to the motor 100 via the AC conductor module 231, this electrical current is a high current such as, for example, 100 A.

Thus, as a construction that makes it possible to flow a high electrical current and moreover to mitigate stresses, a connection is established using a material for the power lead frames such as, for example, annealed copper. The details thereof will be described subsequently with reference to FIG. 8. Moreover, the power module 210 includes relays RY2 and RY3. The heat capabilities of these relays RY2 and RY3 are high, so that they can carry electrical currents of, for example, 100 A. The power module 210 uses a substrate that is excellent at heat dissipation, so that, by the heat dissipation capabilities of the relays RY2 and RY3 being enhanced, it is made possible to utilize compact relays.

Now, since the heat dissipation capability of the substrate of the power module 210 is excellent, it might be contemplated, for example, to fit the relay RY1 that is currently fitted to the DC conductor module 230, to the power module 210 or the like. However, if the relay RY1 is fitted to the power module 210, then the electrolytic capacitors C1, C2, and C3 and the normal filter NF also should be fitted to the power module 210. As a result, the power module 210 is subjected to a high temperature environment while fitting these various components by performing reflow soldering.

If the electrolytic capacitors C1, C2, and C3 are subjected to a high temperature environment, then it is considered that their service lives may be considerably deteriorated. Due to this, by fitting the relay RY1 of this embodiment to the DC conductor module 230, and by also fitting the electrolytic capacitors C1, C2, and C3 to this DC conductor module 230, it is possible to prevent the lives of these components being deteriorated due to the reflow soldering.

Explanation of the Construction of the DC Conductor Module

Figure 5:
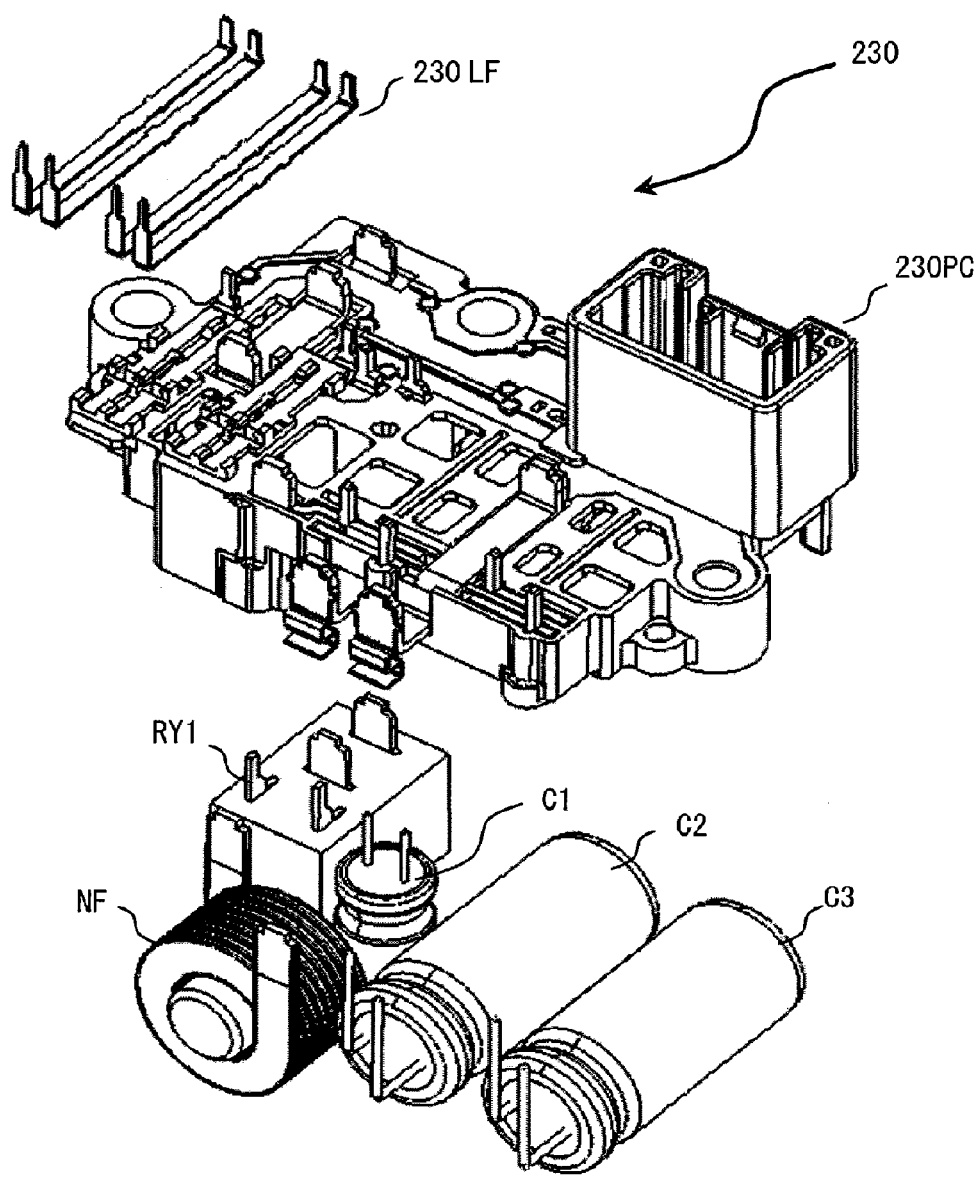
FIG. 5 is an exploded perspective view showing the structure of a DC conductor module of this control device for an electrically operated power steering system according to an embodiment of the present invention.
Figure 6:
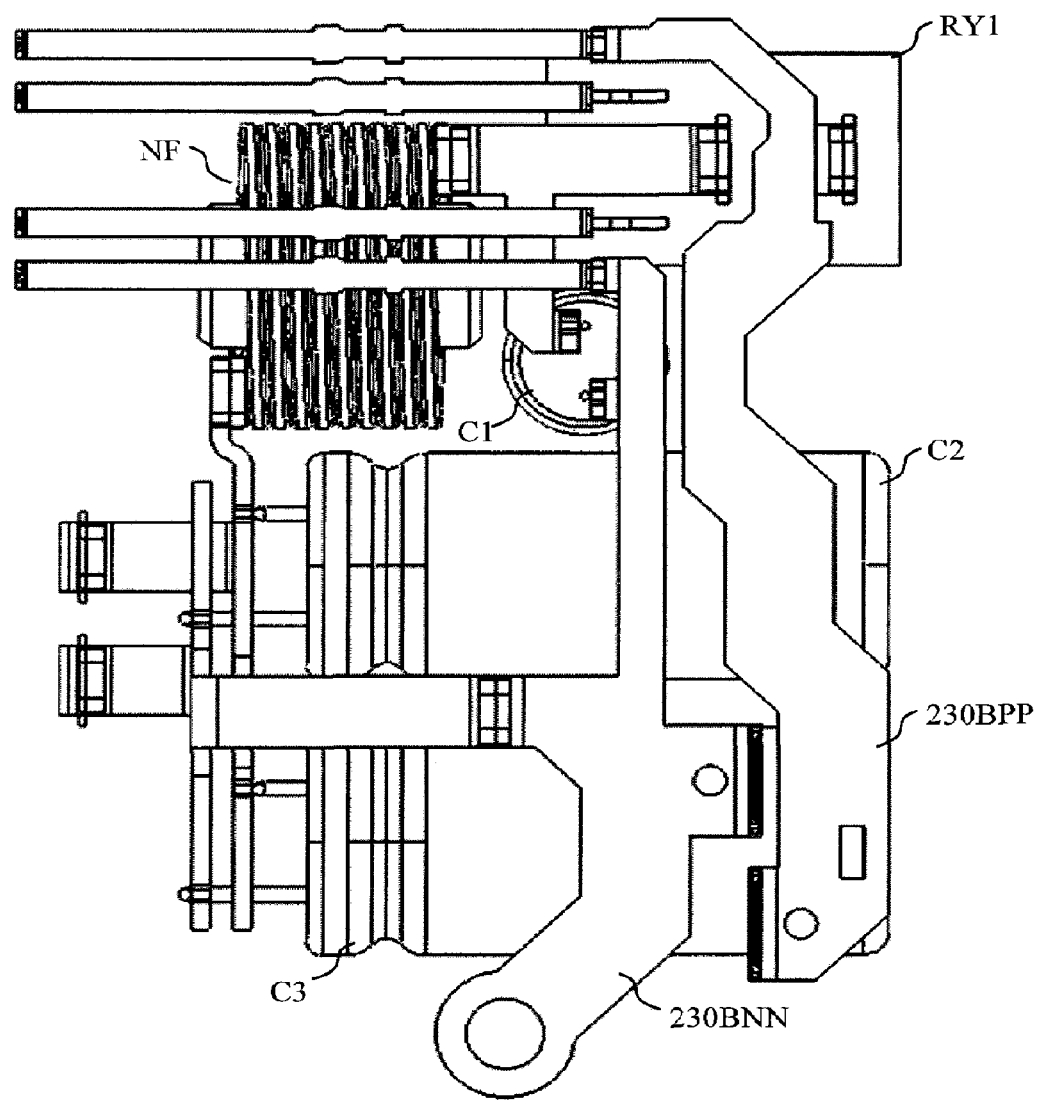
FIG. 6 is a top view of the DC conductor module of the control device with bus bars and associated components, which is for an electrically operated power steering system according to an embodiment of the present invention.

Next, the construction of the DC conductor module 230 of this control device for an electrically operated power steering system according to this embodiment of the present invention will be explained with reference to FIGS. 5 and 6. FIG. 5 is a perspective view showing the structure of this DC conductor module 230 of the control device for an electrically operated power steering system according to this embodiment of the present invention, while FIG. 6 is a top view showing the bus-bars 230B (230BPP and 230BNN) of this DC conductor module 230, along with various other mounted components. It should be understood that to members that are the same as ones shown in FIGS. 1 and 4, the same reference symbols are appended. Moreover, while the way in which the DC conductor module 230 is drawn in FIG. 1 and the way in which the same DC conductor module 230 is drawn in FIGS. 4 and 5 are slightly different, it should be understood that the drawing in FIGS. 4 and 5 is more accurate. However, FIG. 1 is the preferred figure for understanding the positional relationship of the DC conductor module 230 in the motor control device 200 as a whole.

As shown in FIG. 5, during the molding process, apertures are formed in advance in the DC conductor module 230 for inserting the terminals of various electrical components such as the normal filter NF, the electrolytic capacitors C1, C2, and C3, the relay RY1, and so on. These components are arranged in their respective positions, and then, on the upper side in the figure, their terminals are connected by TIG welding to the terminals of the bus-bars 230B.

Moreover, the lead frames for signals 230LF are laminated to the upper surface of the DC conductor module 230 as seen in the figure. The bus-bars 230B and the relay RY1 and the lead frames for signals 230LF are separated by resin, so that they are electrically insulated from one another. The power supply connector 230PC receives supply of electrical current from the battery BA equipped in the vehicle.

As shown in FIG. 4, the electrolytic capacitors C2 and C3 accumulate electric current supplied from the battery BA, and also supply electrical power to the motor 100 according to the operation of the semiconductor switching elements SSW shown in FIG. 1. As shown in FIGS. 5 and 6, these electrolytic capacitors C2 and C3 are arranged so that their cylindrical main bodies lie down flat, so that, when the DC conductor module 230 is mounted upon the module implementation surface 240M, their positive (+) electrode terminals and negative (−) electrode terminals (that are provided upon the one ends of their cylindrical shapes) are arranged to come towards the power module 210 that is mounted upon the heat dissipation surface 240P.

Due to this, the wiring between these electrolytic capacitors C2 and C3 and the power module 210 becomes shorter, and its inductance can be reduced, so that, as a result, the generation of heat is reduced. Moreover, this arrangement makes it possible to reduce the height of the motor control device 200 in the vertical direction.

Figure 14:
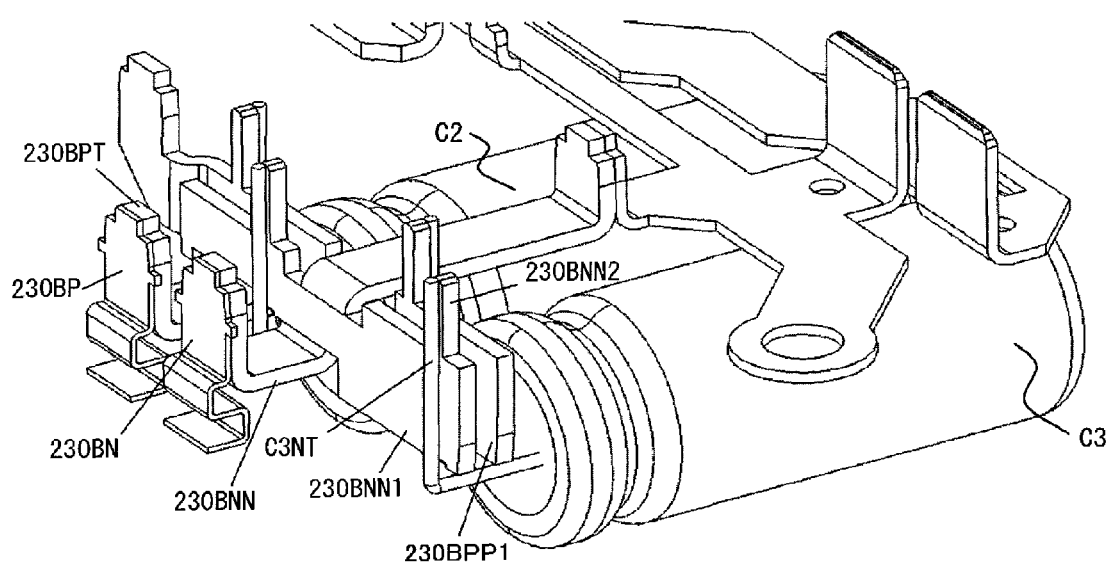
FIG. 14 is a perspective view showing the connection of electrolytic capacitors and bus-bars.
Figure 15:
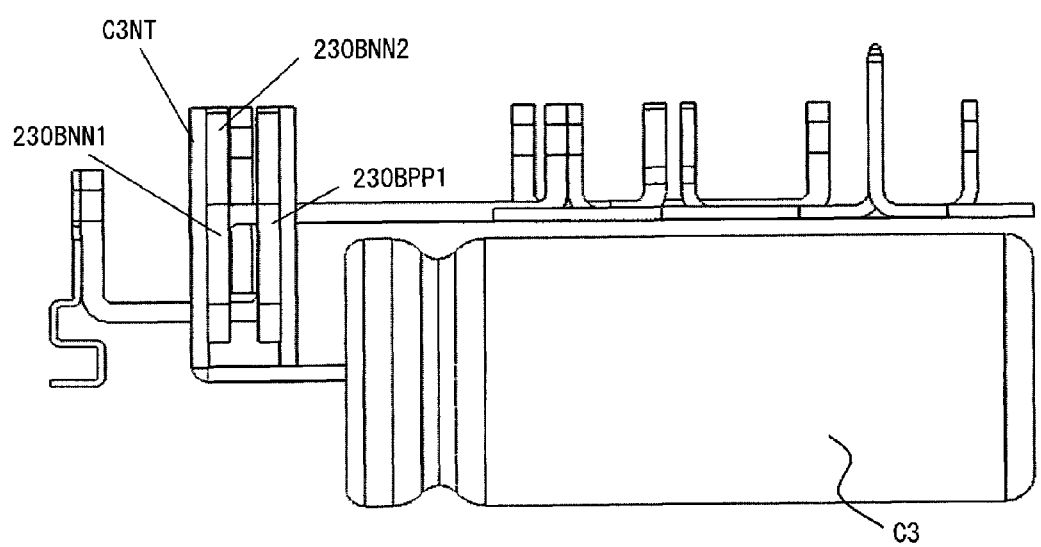
FIG. 15 is a side view showing the connection of the electrolytic capacitors and the bus-bars.

It should be understood that, in this embodiment, a portion of the P side bus-bar 230BPP that is connected to the positive electrodes of the electrolytic capacitors C2 and C3, and a portion of the N side bus-bar 230BNN that is connected to their negative electrodes, are arranged in a layered state (i.e. in a state of being overlapped over one another). FIGS. 14 and 15 are figures that show this situation. The above described portion of the P side bus-bar 230BPP is denoted by the reference symbol 230BPP1, while the above described portion of the N side bus-bar 230BNN is denoted by the reference symbol 230BNN1. By arranging the positive electrode side bus-bar and the negative electrode side bus-bar in this laminated state in this manner, the inductance due to these bus-bars is mutually cancelled due to the reverse directions of the electrical currents in the positive electrode and the negative electrode, so that the overall inductance of the bus-bars can be reduced. As a result, the ripple current in the electrolytic capacitors C2 and C3 is reduced, and accordingly the generation of heat is reduced.

Moreover, in this embodiment, the connections between the electrolytic capacitors C2 and C3 and the bus-bars are implemented by arranging also to layer the connection portions of the terminals of the electrolytic capacitors C2 and C3 and the connection positions of the bus-bars over one another. The arrangements for the electrolytic capacitor C3 will now be explained with reference to FIGS. 14 and 15. The negative electrode side terminal C3NT of this electrolytic capacitor C3 is folded into a letter-L shape, as shown in these figures. On the other hand, a connection portion 230BNN2 extends so as to project upwards from a portion 230BNN1 of the bus-bar 230BNN. Since the bus-bar 230BNN, the portion 230BNN1 of the bus-bar 230BNN, and the electrolytic capacitor C3 and so on are resin molded together, this arrangement is provided in order for the electrolytic capacitor C3 and the bus-bar to be connected together by welding at a spot that has not been covered by resin molding.

Due to the upper end portions of the connection portion 230BNN2 and the terminal C3NT being connected together by welding, electrical currents flow in opposite directions in the connection portion 230BNN2 and in the terminal C3NT that opposes this connection portion 230BNN2, and thus the inductances due to the connection portion 230BNN2 and the terminal C3NT mutually cancel one another. As a result, the inductance of the path that connects from the terminal of the electrolytic capacitor C3 to the bus-bar is reduced, and thereby the generation of heat is reduced.

It should be understood that, if the connection portion 230BNN2 and the terminal C3NT were to be connected together by welding as low (in the figure) thereupon as possible, then, to that extent, the inductance would be reduced. However, as compared to connecting together the connection portion 230BNN2 and the terminal C3NT at their upper end portions, this type of lower connection can only be performed by an extremely complicated and troublesome procedure. Accordingly, this is not desirable from the point of view of simplification of the manufacturing process. On the other hand by, as in this embodiment, providing a structure in which the upper end portions of the connection portion 230BNN2 and the terminal C3NT are connected together by welding via a simple process, so that these elements are overlapped over one another in the fashion described above, it is possible to reduce the inductance, thus achieving reduction of the amount of heat generation while simultaneously simplifying the manufacturing process. Furthermore, it would also be acceptable to arrange to embed all the portions of the connection portion 230BNN2 and the terminal C3NT, except for their upper portions, in the molded resin.

It should be understood that, referring to FIG. 14, the connection between the P side bus-bar 230BPP and the power lead frame 230BP shown in FIG. 4 is made at the P side connection portion (the DC output terminal) 230BPT; and, similarly, the connection between the N side bus-bar 230BNN and the power lead frame 230BN shown in FIG. 4 is made at the N side connection portion (the DC output terminal) 230BNT.

Furthermore, in this embodiment, the components are arranged so that the distances from the positive terminals of the two electrolytic capacitors C2 and C3 to the P side connection portion 230BPT, and the distances from the negative terminals of the two electrolytic capacitors C2 and C3 to the N side connection portion 230BNT, become approximately equal for the two electrolytic capacitors C2 and C3. In other words, the variations of the inductance between the positive and negative terminals of the electrolytic capacitors C2 and C3 become small, and the variations of the current flow rate imposed upon each of the electrolytic capacitors when the semiconductor switching elements SSW operate becomes less between the two electrolytic capacitors. Hence, the temperature increases of the electrolytic capacitors are nearly equal, and therefore the deterioration of a certain capacitor is prevented.

It should be understood that while, in this embodiment, the number of the electrolytic capacitors was described as being two, it would also be possible for the number of electrolytic capacitors that are connected in parallel to be one or three or more, provided that their capacitances are substantially equal. In this case as well, provided that the orientations of the electrolytic capacitors and the way in which they are connected to the bus-bars are the same as described with reference to this embodiment, then similar beneficial operational effects will be obtained.

Explanation of the Construction of the Power Module (in Perspective View)

Figure 7:
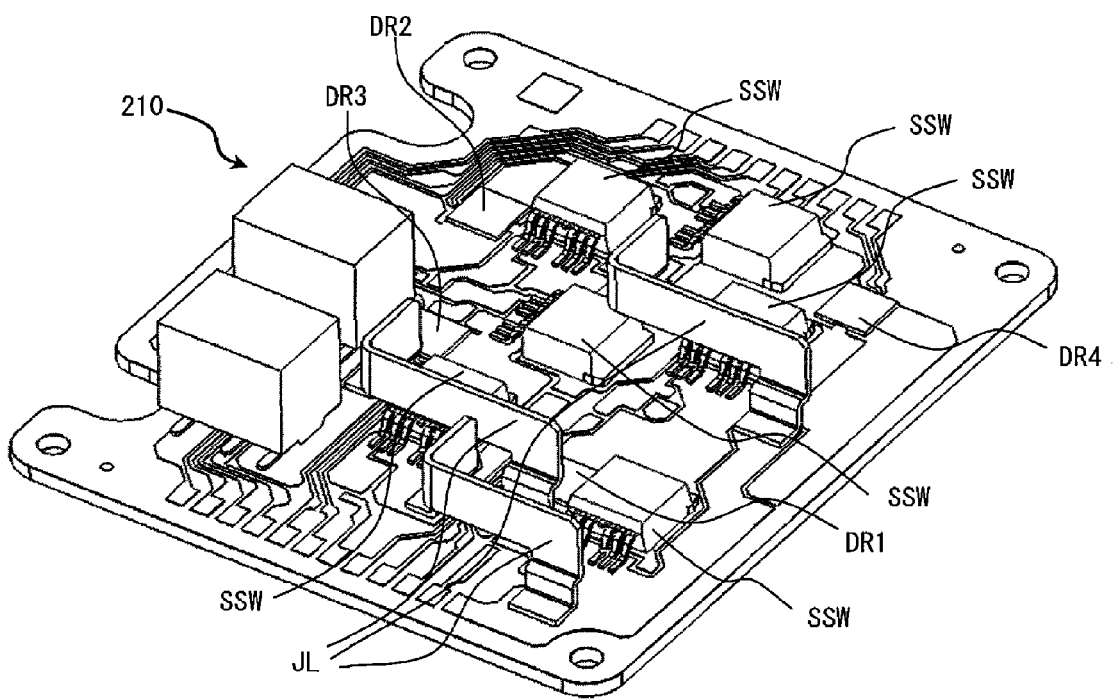
FIG. 7 is a perspective view showing the construction of a power module of this control device for an electrically operated power steering system according to an embodiment of the present invention.
Figure 8:
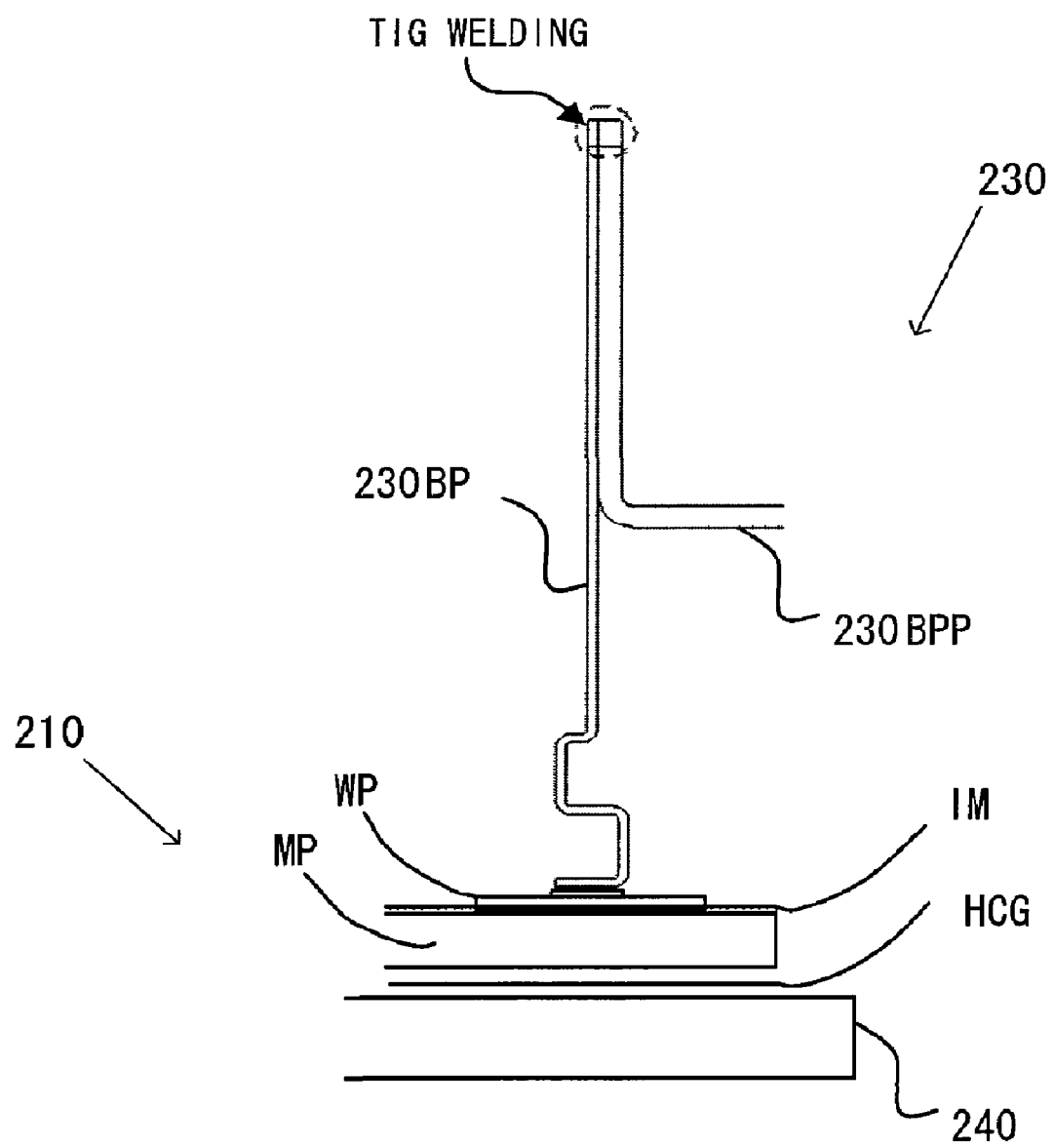
FIG. 8 is a sectional view showing the connections between the power module, the DC conductor module, and an AC conductor module of this control device for an electrically operated power steering system according to an embodiment of the present invention.

Next, the construction of the power module 210 of this control device for an electrically operated power steering system according to this embodiment will be explained using FIGS. 7 and 8. FIG. 7 is a perspective view showing the structure of this power module 210 of the control device for an electrically operated power steering system according to this embodiment of the present invention, while FIG. 8 is a sectional view showing the connections between the power module 210, and the DC conductor module 230 and the AC conductor module 231. It should be understood that to portions that are the same as portions shown in FIG. 1, the same reference symbols are appended.

As shown in FIGS. 7 and 8, this power module 210 is provided with the semiconductor switching elements SSW and with shunt resistors DR1, DR2, DR3, DR4 and so on, and uses a metallic base MP (refer to FIG. 8) made from aluminum or copper or the like for dissipating heat from these components. As shown in FIG. 8, a certain quantity of heat conduction grease HCG is interposed between the metallic base MP and the metallic chassis 240, and the construction is such that the heat that is generated from heat emitting members such as the semiconductor switching elements SSW and so on is dissipated from the metallic chassis 240, via the metallic base MP and the heat conduction grease HCG.

In this embodiment, as also shown in FIG. 7, six pin type MOSFETs are used. Five of these pins are the source, while one is the gate. The drain is connected to the wiring pattern. By using six pin type MOSFETs in this manner, it becomes difficult for heat to be generated by dispersion of electrical current, and moreover the advantageous effect of heat dissipation via the pins also becomes greater.

A wiring pattern WP is formed upon the metallic base MP, with the intervention of an insulating layer IM. This wiring pattern WP is made by etching copper foil of thickness about 105 µm. Moreover, not only are the semiconductor switching elements SSW and the resistors and so on attached to the upper surface of this wiring pattern WP, but also jumper leads JL are provided that straddle between various points upon the wiring pattern. In this power module 210, the freedom of arrangement for the wiring pattern WP is enhanced by the use of these jumper leads JL. In other words, the power module 210 is made more compact, and thereby the motor control device 200 as a whole is made more compact. It should be understood that, in this embodiment, the jumper leads JL are bent into letter-L shapes, and thereby the freedom for arrangement of the wiring pattern is further enhanced.

Next, the details will be explained of the construction of the connection portions between the power module 210, and the DC conductor module 230 and the AC conductor module 231. FIG. 8 shows a portion of the above described connection, and in particular shows the connection between the power module 210 and the P side bus-bar 230BPP. The P side bus-bar 230BPP and the power lead frame 230BP are connected together by TIG welding, and the power module 210 and the power lead frame 230BP are connected together by soldering.

As described above, the power module 210 and the DC conductor module 230 are connected to the metallic chassis 240. Here, since the components that are mounted to the power module 210 and the DC conductor module 230 are different and the amounts of electrical current flowing in them are also different, accordingly the amounts of heat generated in these two modules and their heat dissipation paths are likewise different. Due to this, a temperature difference builds up between the power module 210 and the DC conductor module 230, and a certain stress builds up in the soldered junction of the power lead frame 230BP due to differential thermal expansion.

For this reason, there is a danger that detachment may take place at the soldered junction portions between the power module 210 and the power lead frame 230BP. Furthermore, since a high electrical current of, for example, 100 A, flows in the power lead frame 230BP, accordingly it is desirable to build this frame as a thick member from a metal whose electrical conductivity is good, but, since such a thick metallic member is hard and can only be bent with difficulty, accordingly only a poor effect can be obtained for mitigation of thermal stresses therein.

Thus, a copper material that has been processed in advance by annealing is employed for the power lead frame 230BP of this embodiment, and the stress that is imposed upon its soldered portion is mitigated by employing a bent construction for its lower portion. Moreover, in order to make it possible for a large electrical current to flow in this power lead frame 230BP, its cross sectional area is made to be 2 mm$^2$ or greater. It should be understood that although, by way of example, this matter has been explained here for the power lead frame 230BP, the same measures are implemented for all of the power lead frames used in this embodiment.

Explanation of the Structure for Inductance Reduction (Spike Noise Reduction)

Next, the structure of the layout of the wiring pattern WP of the power module 210 of this control device for an electrically operated power steering system according to this embodiment will be explained with reference to FIG. 9. FIG. 9 is a plan view showing the structure of the layout of the wiring pattern WP of the power module 210 of this control device for an electrically operated power steering system according to this embodiment of the present invention. It should be understood that to elements that are the same as elements shown in FIGS. 7 and 8, the same reference symbols are affixed.

The power module 210 includes the six semiconductor switching elements SSW that may be MOSFETs or the like. These semiconductor switching elements SSW are connected in series to an upper arm and to a lower arm, one for each of the three phases (the U phase, the V phase, and the W phase). Ceramic capacitors CC1, CC2, and CC3 are connected in parallel to the semiconductor switching elements SSW that are connected in series as the upper arm and the lower arm.

These semiconductor switching elements SSW generate spike noise due to their high speed operation for establishing and cutting off continuity, as controlled by control signals. Increase of this spike noise entails increase of the surge voltage of the semiconductor switching elements SSW. The ceramic capacitors CC1, CC2, and CC3 absorb the spike noise that is generated in each of the three phases (the U phase, the V phase, and the W phase), and have the beneficial effect of suppressing the surge voltages. The surge voltages may be obtained by L(di/dt).

To take the example of the W phase here, an inductance L is the inductance of a closed loop from the drain of the upper arm side semiconductor switching element SSWWP via the source of the lower arm side semiconductor switching element SSWWN and via the ceramic capacitor CC3 back to the drain of the upper arm side semiconductor switching element SSWWP again. Moreover, (di/dt) is the rate of change of the electrical current when the semiconductor switching elements SSWWP and SSWWN establish or cut off continuity. In other words, reduction of the surge voltage is performed by reducing this closed loop inductance L.

When the closed loop is formed in the wiring pattern WP of the power module 210, then an eddy current in the direction opposite to that of the closed loop is induced in the metallic base of the power module 210. This eddy current that is generated in the metallic base provides the beneficial effect of canceling out the magnetic field of the closed loop, and has the advantage of reducing the inductance L of the closed loop. The wiring pattern WP of the power module 210 is formed so as to be closely adhered over the metallic base with the interposition of the thin insulation layer, so that a large eddy current is obtained, and the benefit is obtained of reducing the inductance L.

On the other hand, some of the electrical wiring of the power module 210 is constituted by jumper leads JL that straddle between different portions of the wiring pattern WP. These jumper leads JL are separated from the metallic base, so as to hover over it. Due to this, in a structure as previously described that includes a jumper lead JL in the closed loop, the eddy current becomes small, and the advantageous effect of reduction of the inductance L becomes lower. However, in this embodiment, in order to form a closed loop without including any jumper lead JL, the dedicated wiring pattern WPWC shown by slanted hatching in FIG. 9 is provided for connection of the ceramic capacitor CC3. While, in the following, descriptions related to the V phase and the W phase are omitted, it should be understood that the same beneficial effects as for the U phase are obtained by employing similar constructions.

Explanation of the Construction for Reducing Radio Noise from the Circuit Structure Next, a construction for reduction of radio noise in this control device for an electrically operated power steering system according to this embodiment will be explained with reference to FIG. 10. FIG. 10 is a circuit diagram showing the circuit structure of the control device for an electrically operated power steering system according to this embodiment of the present invention. It should be understood that to elements that are the same as elements shown in FIGS. 1 and 4, the same reference symbols are affixed.

The length of a harness BAN shown in FIG. 10 is about 1 meter. As will be described hereinafter, radio noise is emitted from this harness BAN, due to noise current flowing in the harness BAN. In other words, the harness BAN fulfils the role of an antenna that emits noise. Thus, in this embodiment, various means for reducing the noise current flowing in this harness BAN are resorted to.

First, the path that is a source of noise current and that thus is a source of radio noise, and the method for reducing this noise current, will be explained. Voltage pulsations upon the power supply line are generated by the switching operation of the semiconductor switching elements SSW shown in FIG. 10. And a normal mode noise current (A) shown at (A) of FIG. 10 is generated due to these voltage pulsations. This normal mode noise current (A) flows from the drain sides of the semiconductor switching elements SSW through the P side bus-bar 230BPP and the P side harness BAP, and follows a return path to the source sides of the semiconductor switching elements SSW via the N side harness BAN and the N side bus-bar 230BNN of the bus-bar 230B. And the radio noise described previously is generated by this normal mode noise current (A) flowing in the P side harness BAP and the N side harness BAN.

Thus, in this embodiment, the normal filter NF is inserted into the P side bus-bar 230BPP, and moreover the electrolytic capacitor C1 is connected between the P side bus-bar 230BPP and the N side harness BAN. Since, due to this, it is possible to drain the normal mode noise current (A) from the P side bus-bar 230BPP to the N side bus-bar 230BNN, accordingly it is possible to prevent noise current flowing in the P side harness BAP and the N side harness BAN (refer to (A') in FIG. 10). In other words, it is arranged to form a filter with the normal filter (coil) NF and the electrolytic capacitor C1, that ensures that the normal mode noise current (A) does not flow out to the harnesses BAP and BAN of the battery. That is, due to the filter formed in this manner, the normal mode noise is prevented from flowing out to the harnesses BAP and BAN.

Furthermore, a common mode noise current (B) is generated by the voltage pulsations that are generated due to the switching operation of the semiconductor switching elements SSW. This common mode noise current (B) pursues two paths. On the one hand, there is a common mode noise current (B-1) that originates in voltage pulsations at the lower arm side source terminals LS of the semiconductor switching elements SSW; and, on the other hand, there is a common mode noise current (B-2) that originates in voltage pulsations at the upper arm side source terminals HS of the semiconductor switching elements SSW (refer to (B-1) and (B-2) in FIG. 10). The radio noise described above is created by either or both of these common mode noise currents (B-1) and (B-2) flowing in the N side harness BAN.

In the prior art, a common filter was provided in the position shown by CF in FIG. 10, in order to prevent the common mode noise current (B-1) flowing into the N side harness BAN. However, since this common filter is an electronic component of comparatively large size, it presented a problem with regard to demands for making this type of electrically operated power steering device more compact.

Thus in this embodiment (1): the N side bus-bar 230BNN and the PCB control ground 225GS (implemented in the control module 220) are electrically connected together by the N side power supply wiring 225N. The impedance of this N side power supply wiring 225N is smaller than that of the N side harness BAN. Due to this, the common mode noise current (B-1) flows into the N side power supply wiring 225N. Moreover (2): the PCB control ground 225GS and the PCB power ground 225GP are electrically connected together via a diode 226D. This diode 226D is connected so that the direction from the PCB control ground 225GS to the PCB power ground 225GP is its forward direction. Yet further (3): the PCB power ground 225GP and the lower arm side source terminals LS are electrically connected together by a gate return line GP.

Due to the above described connection relationships (1) through (3), the common mode noise current (B-1) comes to follow the current path (B'-1) shown in FIG. 10. In other words, it follows an electrical current path through the N side bus-bar 230BNN, the PCB control ground 225GS, the diode 226D, the PCB power ground 225GP, the lower arm side source terminals LS, and the N side bus-bar 230BNN. Due to this, it is not necessary to provide any large sized electronic component such as a common filter in the position of CF, and it is possible to ensure that the common mode noise current (B-1) flows in the N side harness BAN. In other words, along with making the control device as a whole more compact, it is also possible to reduce the noise by confining the common mode noise current (B-1) within the metallic chassis.

It should be understood that, by interposing the diode 226D (set with its forward direction as shown in the figure) between the PCB control ground 225GS and the PCB power ground 225GP, it is possible to reduce the noise current that gets into the control module 220 from the lower arm side source terminals LS. Moreover, it is desirable not to provide any noise countermeasure component such as a common filter or a normal filter or the like between the P side power supply wiring 225P and the N side power supply wiring 225N. The reason for this is that any such noise countermeasure component would increase the impedance upon the common mode noise path, and that accordingly it might become impossible to confine the noise therein.

Furthermore, in this embodiment, various means are adopted for reducing the voltage pulsations, that constitute a cause for generation of noise current.

One of the main voltage pulsations is a voltage pulsation due to the switching operation of the semiconductor switching elements SSW that is transmitted to the PCB control ground 225GS via the PCB power ground 225GP. In this embodiment, in order to reduce this voltage pulsation, the PCB control ground 225G and the metallic chassis 240 are short circuited together by a short circuiting screw 225GG. A second main voltage pulsation is a voltage pulsation due to the switching operation of the semiconductor switching elements SSW that is directly transmitted to the N side bus-bar 230BNN. In this embodiment, in order to reduce this voltage pulsation, the N side bus-bar 230BNN and the metallic chassis 240 are short circuited together by a short circuiting screw 230BC.

In addition to these countermeasures against voltage pulsations: (1) a normal coil NF2 is provided before the connection between the ignition line IGN and the P side power supply wiring 225P; and (2) the metallic chassis 110 of the motor 100 and the metallic chassis 240 are electrically connected together, for example by a screw 100B or the like. Due to this, the previously described common mode noise current (B-2) flows to the metallic chassis 240 via this electrical connection 100B after having dropped the parasitic capacity 100C of the motor 100, and is discharged via the short circuiting screw 230BC and/or the short circuiting screw 225GG to the PCB control ground 225GS of the control module 220 and the PCB power ground 225GP, or is discharged to the N side bus-bar 230BNN (B'-2).

This is in order for the impedance from the metallic chassis of the motor 100 to the N side bus-bar 230BNN of the DC conductor module 230 and to the PCB control ground 225GS of the control module 220 upon the path via the electrical connection 100B and the metallic chassis 240 to be lower than that on the path via the chassis CS and the harness BAN. In other words, a path is formed by the electrical connection 100B, the metallic chassis 240, the short circuiting screw 230BC, the short circuiting screw 225GG, the PCB control ground 225GS, the diode 226D, and the PCB power ground 225GP, through which the common mode noise current (B-2) can flow more easily. As a result, the common mode noise current (B-2) is prevented from flowing in the harness BAN, so that emission of radio noise from the harness BAN is prevented.

It should be understood that, by its impedance being raised to be higher than that of the ignition line IGN, the normal coil NF2 is able to suppress the ingress of noise into the control module 220 from the chassis CS via the ignition line IGN.

Explanation of the Assembly Process

Next, the assembly procedure when connecting this module 220 of this control device for an electrically operated power steering system according to this embodiment of the present invention to the lead frame 230LF and the lead frame SLF, will be explained with reference to FIGS. 1 and 11. FIG. 11 is a perspective view showing the assembly construction when connecting together the control module 220 of this control device for an electrically operated power steering system according to this embodiment of the present invention, and the lead frame 230LF and the lead frame SLF. It should be understood that to portions that are the same as in FIG. 1, the same reference symbols are appended.

The signal lead frames SLF of the power module 210 and the lead frame 230LF of the DC conductor module are connected to terminals of the control module 220. Moreover, the control module 220 is fixed by screws to the metallic chassis 240. The signal lead frames are arranged in rows along both ends of the control module 220. The positional determination when inserting the lead frames into the terminal holes of the control module 220 after having arranged them in these rows is simple and easy, so that it is possible to make the assembly characteristics simple and easy. Moreover, with the construction according to this embodiment, the connection task when connecting together the control module 220 and the lead frames by soldering can be performed in an efficient manner.

The control module 220 is connected to struts 240T (refer to FIG. 1) of the metallic chassis 240 by screws. Moreover, via the signal lead frames SLF that are soldered to the control module 220, that control module 220 is also connected by soldering to the power module 210. Stress due to thermal expansion of the control device as a whole and of the control module 220 is applied to the soldered portions of the signal lead frames SLF. Thus, by utilizing an angled construction (refer to FIG. 8) for the signal lead frames SLF, it is possible to mitigate this stress in the soldered portions of the signal lead frames SLF.

Explanation of the Connection Relationship Between the Motor and the ECU

Next, the assembly procedure for the motor control device 200 and the motor 100 of this control device for an electrically operated power steering system according to this embodiment of the present invention will be explained with reference to FIGS. 1 and 12. FIG. 12 is a perspective view showing the motor control device 200 and the motor 100 of this control device for an electrically operated power steering system according to this embodiment of the present invention. The motor control device 200 is made so as to be held integrally with the motor 100. It should be understood that to portions that are the same as in FIG. 1, the same reference symbols are appended.

First, the metallic chassis 240 of the motor control device 200 is electrically and also mechanically connected to the motor 100 by screws (100B). Next, the bus-bars 231B of the AC conductor module 231 of the motor control device 200 are electrically connected by screws 231S to the three phase input units 100T of the motor 100 via the terminals 231T of the motor terminal block 231SC. And next, the connection portions of the bus-bars 231B are covered over by a metallic cover 250M. Finally, the cover 250M is fixed to the metallic chassis 240 by at least one screw, so that the cover 250M and the metallic chassis 240 are securely electrically connected together. By the above, the motor control device 200 and the motor 100 are assembled together.

In this manner, it is arranged to provide the motor 100 on the opposite side from the metallic chassis 240. If the motor 100 were to be provided upon the same side as the metallic chassis 240, then the heat would be confined due to the influence of the motor 100, and this is not desirable from the point of view of heat dissipation. Further, since heat is also generated by the motor 100 itself, this heat is also confined. However, since in this embodiment it is arranged to provide the motor 100 on the opposite side from the metallic chassis 240, accordingly this aspect is improved upon, and the benefit for dissipation of heat from the metallic chassis 240 is improved.

Moreover, the motor 100 is connected and supported by the struts 240T that extend from the metallic chassis 240 to past the power module 210 on the motor side. These struts 240T are made from aluminum, just like the metallic chassis 240, and accordingly their thermal conductivity is good. Therefore the heat from the metallic chassis 240 can be transmitted to the motor 100 via the struts 240T, and is thus dissipated from the motor 100. Due to this, the heat dissipation performance of this motor control device 200 is improved.

Furthermore, the rotation shaft of the motor 100 is assembled so as to be approximately parallel to the mounting surface of the switching elements of the power module. Moreover, the cylinder side portion of the motor 100 is arranged so as to be adjacent to the power module. However, the cylinder side portion of the motor 100 need not necessarily be arranged to contact the power module; it is arranged so as to leave a slight gap between them. And, as a result of employing the structure of this embodiment in which the width of this control device for an electrically operated power steering system is made more compact in the direction that is orthogonal to the direction of the rotation shaft of the motor 100, it becomes possible to reduce this width to be even smaller than the external cylindrical diameter of the motor 100.

It should be understood that, since the cover 250M is a shield cover that is made from metal, accordingly it also fulfils the function of an electromagnetic shield and an electrostatic shield that absorbs radiated noise generated by the three phase input unit of the motor 100; for example, it can absorb radiated noise of frequency 1 MHz or lower, and in particular can reduce radiated noise in the smart bandwidth (135 kHz). Moreover it should be understood that this cover 250M may also be made from resin, provided that it is electrically conductive, in other words that it can fulfill the function of an electromagnetic shield and an electrostatic shield.

Explanation of the overall system structure of the electrically operated power steering system.

Next, a system structure that employs this control device for an electrically operated power steering system according to an embodiment of the present invention will be explained with reference to FIG. 13. FIG. 13 is a system structural diagram showing the structure of an electrically operated power steering system that employs this control device for an electrically operated power steering system according to an embodiment of the present invention. This electrically operated power steering system is mounted in a vehicle. This vehicle may be a passenger car, a truck, a working vehicle, or the like, or indeed any vehicle that possesses a steering system.

When the steering ST is rotated, this rotational drive force is transmitted via a rod RO to a manual steering gear STG in which it is geared down, that is then transmitted via left and right tie rods TR1 and TR2 to left and right vehicle wheels WH1 and WH2, thus steering the left and right vehicle wheels WH1 and WH2.

The motor 100 according to this embodiment of the present invention is fitted in the neighborhood of the rod RO, and transmits its own drive force to the manual steering gear STG via a gear GE. A torque sensor TS is fitted to the rod RO, and detects the rotational drive force (i.e. the torque) that is applied to the steering ST.

The control device 200 calculates a target torque for the motor 100 on the basis of the output of the torque sensor TS, and on the basis of the output of a vehicle speed sensor of the vehicle, not shown in the figure. In this calculation, the target torque for the motor 100 may be calculated while also considering the rotational speed and the rotational acceleration of the motor 100, and, by doing so, it becomes possible to perform optimum control, so as to provide an excellent steering feeling. Furthermore, from the point of view of safety, the temperature of the motor 100 and the value of the electrical current passing through it are detected, and the electrical current that is supplied to the motor 100 is controlled so that as to attain an electrical current value that corresponds to the value that will yield the target torque for the output of the motor 100. The power supply for the control device 200 and the motor 100 is supplied from the battery BA.

It should be understood that while, in the structure described above, the torque sensor and the motor 100 that assists the torque are positioned in the portion of the steering column that is immediately below the steering wheel, it would also be possible to utilize the motor 100 and the motor control device 200 that includes the inverter construction described above just as it is without alteration, also for a rack type power steering in which the motor 100 is provided in the neighborhood of a rack and pinion gear.

Although the present invention has been explained in concrete terms above on the basis of a preferred embodiment thereof, the present invention should not be considered as being limited to the details of that embodiment; as a matter of course, various changes could be made to any embodiment of the present invention, without departing from its scope.

Figure 16:
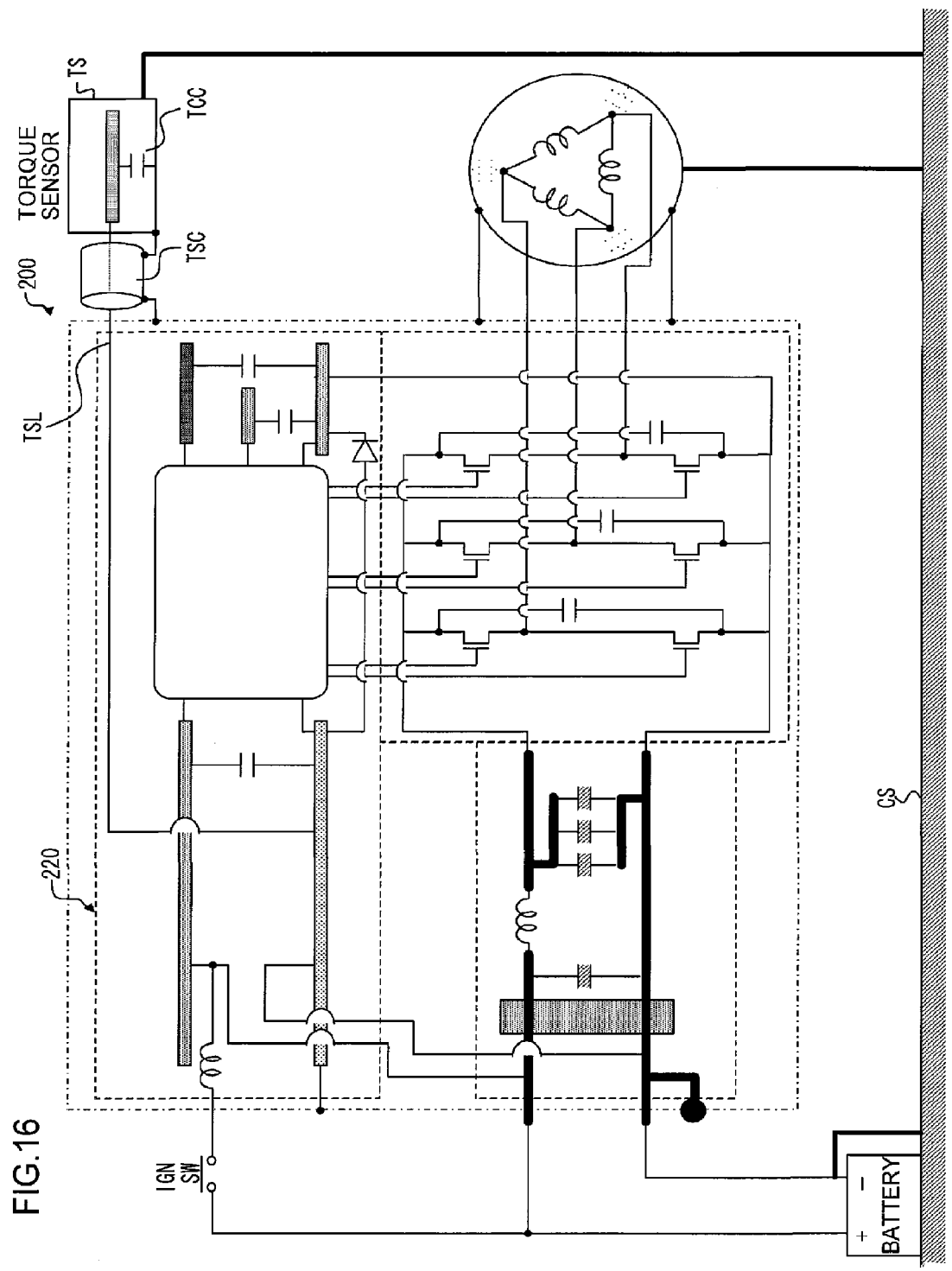
FIG. 16 is a circuit diagram showing the structure of another noise countermeasure system.

Other structures for radio noise reduction in this electrically operated power steering system control device according to this embodiment will now be explained, by way of example, with reference to FIGS. 16 through 19. It should be understood that to elements that are the same as ones in FIG. 10, the same reference symbols are appended. FIG. 16 takes a torque sensor or the like as an example, and shows a structure for radio noise countermeasures against the occurrence of radio noise created due to this sensor.

In order to prevent malfunction of this torque sensor TS due to noise, a structure is provided in which an internal sensor circuit of the sensor TS and the metallic chassis of the sensor TS are connected together with a capacitance TCC, so that noise is discharged to the chassis CS. However, since this capacitance TCC resonates at a specific frequency due to inductance of the signal lines of the torque sensor TS and its ground line TSL and so on, accordingly a noise current of this resonant frequency is discharged to the chassis CS. As described above, this noise current that is discharged to the chassis CS emits a strong noise by getting into the other harnesses.

Thus, FIG. 16 shows a structure as a countermeasure against resonant noise of the torque sensor TS, in which a shield cable TSC is used. This shield cable TSC is built so as to cover the signal lines of the torque sensor TS and its ground line TSL with a metallic mesh, and, as shown in the figure, this metallic mesh is electrically connected to the metallic chassis of the torque sensor TS and the metallic chassis of the motor control device 200. Since, by the structure described above, the resonant noise that escapes due to the capacity TCC is returned to the motor control device 200 via the metallic mesh of the shield cable TSC that is a lower impedance path than escaping to the chassis CS, accordingly transfer of this noise current to the other harnesses is suppressed.

Furthermore, due to the beneficial effect of the electromagnetic shield and electrostatic shield that are made from metal mesh, it is also possible to suppress radiated noise due to voltage pulsations that are generated in the signal line or the ground line TSL of the torque sensor TS. While, in this embodiment, a shield cable TSC has been explained by way of example, it would also be acceptable to provide some other type of structure, provided that it constitutes a low impedance path. For example, instead of using the shield cable TSC, it would also be possible to utilize a harness that is electrically connected to the metallic chassis of the torque sensor TS and to the metallic chassis of the motor control device 200. Moreover, a coaxial line could also be used.

Figure 17:
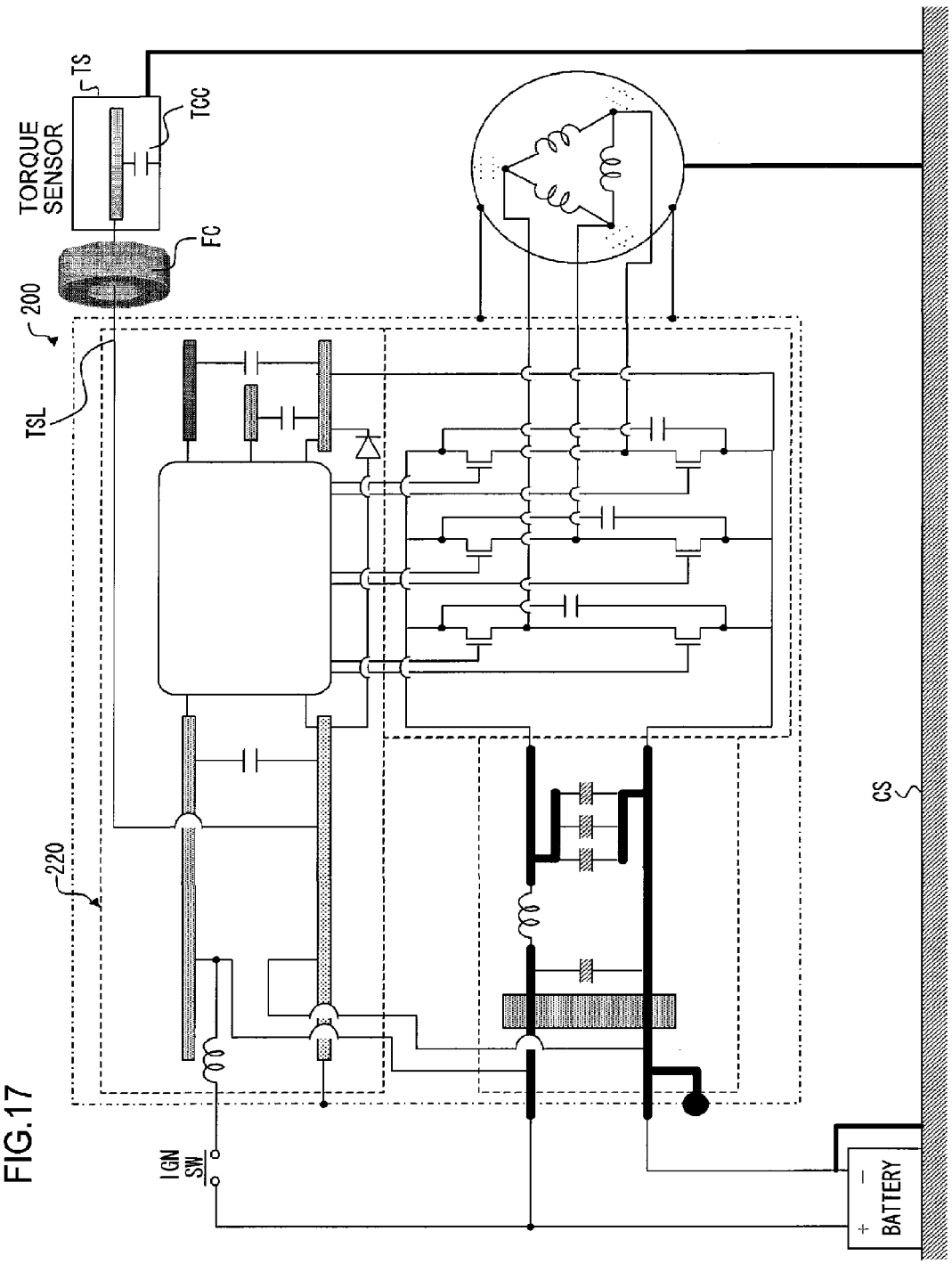
FIG. 17 is a circuit diagram showing the structure of yet another noise countermeasure system.

FIG. 17 shows another structure as a countermeasure against resonant noise of the torque sensor TS. In this countermeasure shown in this figure, instead of the shield cable TSC shown in FIG. 16, for example, the signal line and the ground line of the torque sensor TS are wound through a ferrite core FC, so that the inductance of the signal line and the ground line is increased. Since this inductance is greater the higher the frequency becomes, accordingly it becomes harder for the resonant noise itself to flow, so that it becomes possible to reduce the radiated noise. Moreover, as a countermeasure other than a ferrite core, it would also be acceptable to utilize a magnet or to utilize an inductance element, provided that the result is an increase of the inductance of the torque sensor TS. Furthermore, it would also be acceptable to provide a chip inductor or the like to the control module 220 of the motor control device 200.

Figure 18:
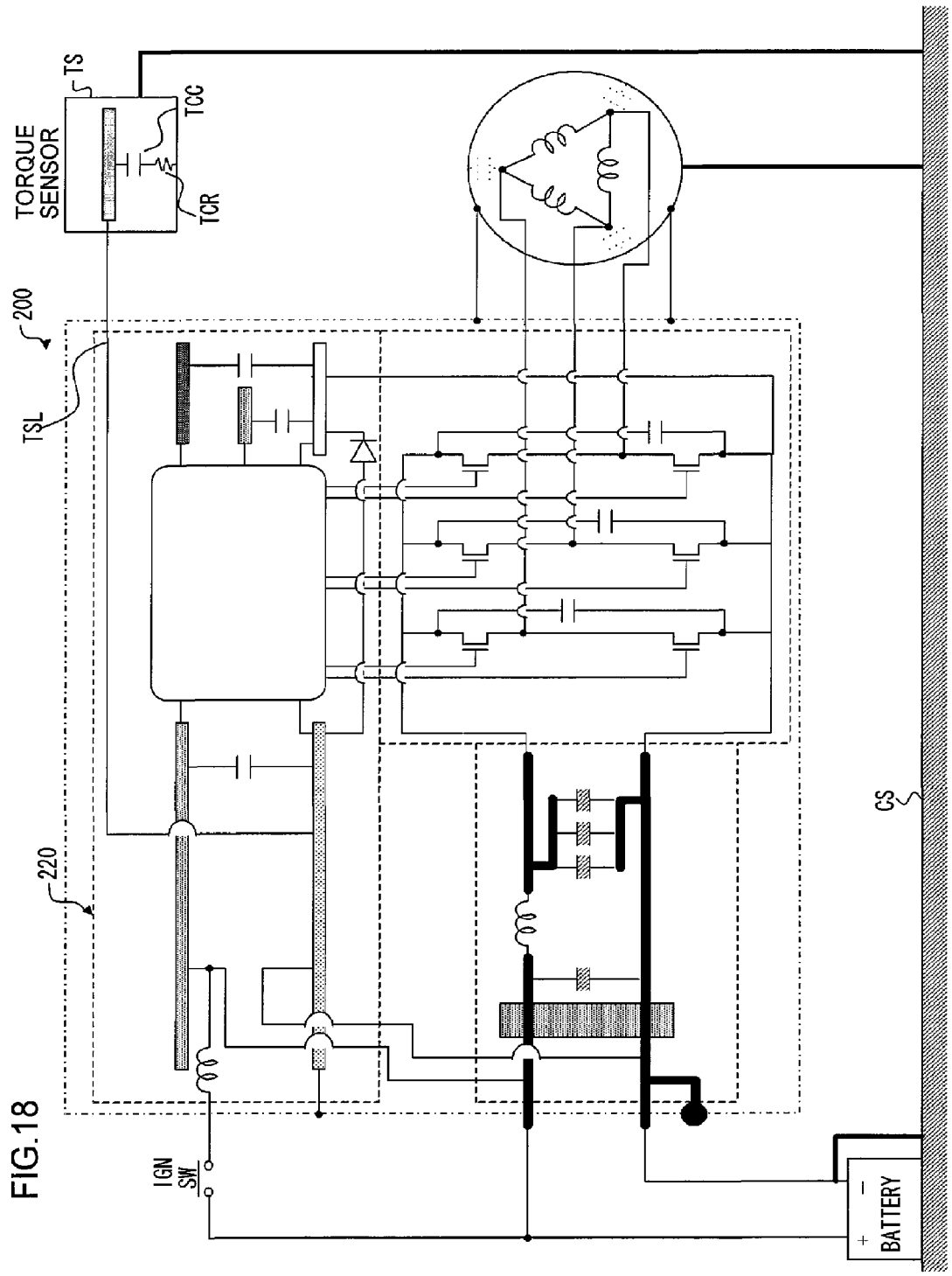
FIG. 18 is a circuit diagram showing the structure of still another noise countermeasure system.

FIG. 18 shows another structure as a countermeasure against resonant noise of the torque sensor TS. In the countermeasure shown in this figure, for example, a damping resistor TCR is inserted in series in the capacitance TCC, that is a resonant source. When the resonant noise is being extracted via the capacitance TCC, its energy is consumed by this damping resistor TCR, so that the radiated noise is reduced. Moreover, other than this damping resistor TCR, it would also be acceptable to utilize an inductance element, so as to shift the frequency of the resonant noise towards the low frequency side.

Figure 19:
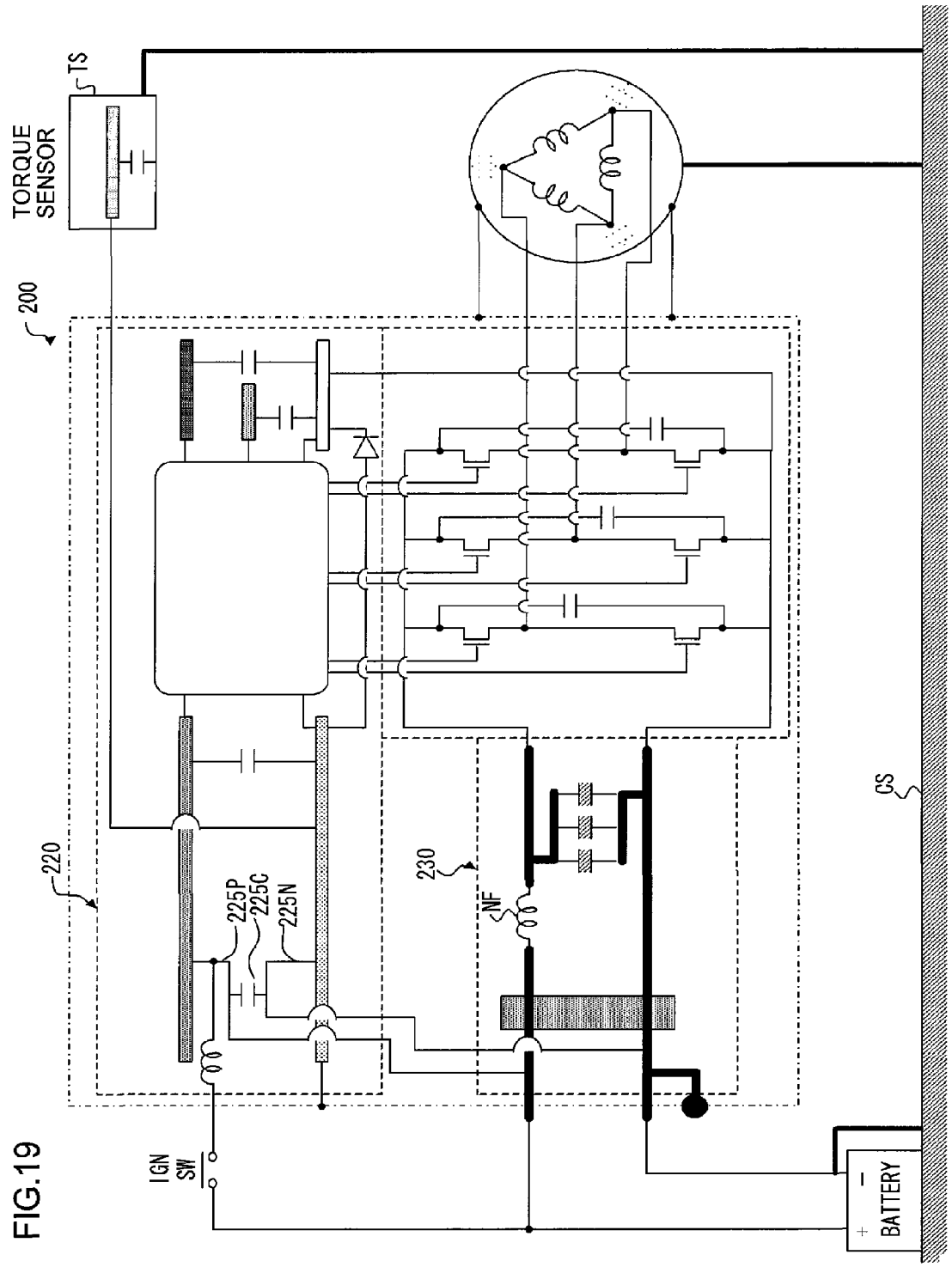
FIG. 19 is a circuit diagram showing the structure of even another noise countermeasure system.

FIG. 19 shows another structure of a filter that can reduce the normal mode noise. The filter shown in FIG. 10 includes the normal filter NF and the electrolytic capacitor C1. However, with this structure shown in FIG. 19, the electrolytic capacitor C1 is omitted, and, instead, a ceramic capacitor 225C is provided between the P side power supply wiring 225P and the N side power supply wiring 225N of the control module 220. Although this ceramic capacitor 225C needs to be of sufficient size, nevertheless, by it being possible to eliminate the electrolytic capacitor C1, it is still possible to make the DC conductor module 230 more compact.

According to these embodiments as explained above, the following beneficial operational effects may be obtained.

(1) It is arranged for this control device for an electrically operated power steering system 200 that integrally supports the motor 100 to include: the power module (i.e. the power substrate) 210 upon which the switching elements SSW that drive the motor (i.e. the electric motor) 100 are provided; the metallic chassis (i.e. the heat dissipation member) 240 that is provided upon the opposite one of two surfaces of the power module 210 from that surface upon which the switching elements SSW are provided; and the struts (i.e. the support portions) 240T that extend from the metallic chassis 240 on the side of the power module 210 for supporting the motor 100. Due to this, the motor 100 comes to be provided on the opposite side from the metallic chassis 240, so that heat dissipation from the metallic chassis is not impeded by the motor 100, and thus the heat does not accumulate therein, so that the beneficial effect of heat dissipation from the metallic chassis 240 is improved.

(2) It is arranged for the metallic chassis 240 to be provided with the heat dissipation fins 240F on its opposite side from its side that contacts the power module 210. In a similar manner to that described above, the heat dissipation from these heat dissipation fins 240F is not impeded by the motor 100, so that the beneficial effect of heat dissipation from the metallic chassis 240 is improved.

(3) This control device for an electrically operated power steering system 200 is further provided with the DC conductor module 230 (i.e. the DC current system conductor unit) that is supplied with DC electrical current from the battery BA and that supplies that DC electrical current to the switching elements SSW, and moreover it is arranged for this DC conductor module 230 to be provided upon a side portion of the power module 210. By doing this, it is possible to make the extent of the motor control device 200 in its height direction lower, as compared to the case of disposing the DC conductor module 230 on the upper portion of the power module 210. Moreover, it becomes possible to line up each of the input of DC electrical current from the battery BA to the DC conductor module 230, the output of DC electrical current from the DC conductor module 230 to the power module 210, the input of DC electrical current to the power module 210, and the output of AC electrical current from the power module 210, upon a single straight line. In other words, it becomes possible to line up the input for DC electrical current, the conversion from DC to AC, and the output for AC electrical current, into straight line configurations. Due to this, it is possible to make the various wires shorter, to reduce the DC resistance component and inductance component, and to reduce the generation of heat.

(4) It is arranged for the DC conductor module 230 to be provided at a side portion of the power module 210 and moreover upon the metallic chassis 240. The temperature of the DC conductor module 230 itself is elevated by temperature increase and so on of its electrolytic capacitors and the like. However, according to the above type of structure, it is possible to ensure good heat dissipation, due to the beneficial effect of heat dissipation from the metallic chassis 240. Moreover, it is also possible to obtain the advantageous effect described previously in (3) above.

(5) The DC conductor module 230 is arranged to be placed on the other side of the metallic chassis 240 from the struts 240T, in which the power module 210 is placed between the DC conductor 230 and the struts 240T. Due to this, it is possible further to obtain the advantageous effect described previously in (3) above.

(6) In this DC conductor module 230, it is arranged to provide the power supply connector 230PC for connection to the battery BA, upon the opposite side to its side that contacts against the metallic chassis 240. Due to this, there is no interference between this power supply connector 230PC and any heat dissipation member such as the heat dissipation fins 240F and so on. Moreover, it is ensured that the power supply connector 230PC does not project to the exterior from the external shape of the motor control device 200 as a whole. As a result, it is possible to provide a motor control device 200 that has a compact shape.

(7) It is arranged to provide the power supply connector 230PC of the DC conductor module 230 more to the outside than the end portion of the motor 100 in the axial direction. Due to this, it is possible to utilize the extra space at the rear portion of the motor 100 in an effective manner, and thereby it is possible to make this electrically operated power steering device, and the space in which this electrically operated power steering device is installed, more compact. Moreover, the motor control device 200 as a whole is not made uneven by any protrusion of the connector, so that it is possible to ensure that it is made more compact, due to its external appearance being neat. Furthermore, it is possible to insert a connector for a cable from the battery BA or the like without suffering any impediment from the motor 100, so that the workability becomes better. Thus, even when the cables from the battery BA are connected after this motor control device 200 in which the motor 100 has been manufactured integrally has been fitted to the vehicle, still it is possible to fit the cables in a simple and easy manner, so that the workability is good.

(8) With this control device for an electrically operated power steering system 200, there is further provided the control module 220 (i.e. the control board) that transmits control signals to the switching elements SSW, so as to control the switching of those switching elements SSW; and this control module 220 is provided so as to be positioned between the power module 210 and the motor 100 that is supported, and so that at least a portion thereof is overlapped with the DC conductor module 230. Due to this, along with it being possible to make the motor control device 200 more compact, it becomes possible to arrange the signal connector 220C so that it is close to the power supply connector 230PC of the DC conductor module 230, and thereby the workability for connecting cables to the signal connector 220C and to the power supply connector 230PC becomes good.

(9) In the control module 220, it is arranged for the signal connector 220C through which signals are inputted and outputted from and to the exterior of this control device for an electrically operated power steering system, to be provided upon the surface on the side of the motor 100. Due to this, it is possible to ensure that this signal connector 220C does not project to the exterior from the external shape of the motor control device 200 as a whole. As a result, it is possible to provide a motor control device 200 of a compact shape.

(10) It is arranged for the signal connector 220C of the control module 220 to be provided more towards the exterior than the end portion of the motor 100 in its axial direction. Due to this, it is possible to utilize the extra space at the rear portion of the motor 100 in an effective manner, so that it is possible to make this electrically operated power steering device, and the space in which this electrically operated power steering device is installed, more compact. Moreover, the motor control device 200 as a whole is not made uneven by any protrusion of the connector, so that it is possible to ensure that it is made more compact, due to its external appearance being neat. Furthermore, it is possible to insert a connector for a control signal from the exterior of the motor control device 200 without suffering any impediment from the motor 100, so that the workability becomes better. Thus, even when the cable for the control signal from the exterior of the motor control device 200 is connected after this motor control device 200 in which the motor 100 has been manufactured integrally has been fitted to the vehicle, still it is possible to fit the cable in a simple and easy manner, so that the workability is good.

(11) In the DC conductor module 230, it is arranged to provide the electrolytic capacitors C2 and C3 for smoothing the DC electrical current from the battery BA, and the bus-bars (i.e., the plate shaped conductors) for connection to these electrolytic capacitors C2 and C3; and it is arranged to provide the bus-bars in which the electrical current flows on the positive electrode sides of the electrolytic capacitors C2 and C3, and the bus-bars in which the electrical current flows on the negative electrode sides of the electrolytic capacitors C2 and C3, so that they are overlapped. By doing this, the inductances in the bus bars due to the electrical currents that flow in reverse directions in the positive electrodes and in the negative electrodes mutually cancel one another, so that, as a whole, the inductance of the bus-bars is reduced. As a result, it is possible to reduce the ripple electrical current of the electrolytic capacitors C2 and C3, and it is possible to reduce the generation of heat.

(12) When the electrolytic capacitor C3 and the bus-bar are to be connected and the terminal C3NT of the electrolytic capacitor C3 and the projecting shape of the connection portion 230BNN2 of the bus-bar are to be connected together, it is arranged for the terminal C3NT of the electrolytic capacitor C3 and the projecting shape of the connection portion 230BNN2 of the bus-bar to be arranged so as to overlap one another, and for them to be connected so that the directions of the electrical currents that flow in them are in mutually reverse directions. By doing this, electrical currents flow in reverse directions in the connection portion 230BNN2 and the terminal C3NT that faces this connection portion 230BNN2, so that the inductances of the connection portion 230BNN2 and of the terminal C3NT mutually cancel one another. As a result, the inductance upon the path that connects from the terminal of the electrolytic capacitor C3 to the bus-bar is reduced, so that the generation of heat is reduced.

Moreover, even though the bus-bar 230BNN, the one portion 230BNN1 of the bus-bar 230BNN, the electrolytic capacitor C3 and so on are resin molded, it can be easily connected by welding the positions where these are not molded with resin, so that it is possible to attain reduction of the inductance and reduction of heat generation by a process whose workability is simple. The same remarks hold for the electrolytic capacitor C2.

(13) The DC conductor module 230 is provided with the electrolytic capacitors C2 and C3 for smoothing the DC electrical current, with the electrolytic capacitors C2 and C3 being formed as cylinders, and with it being arranged to provide these capacitors C2 and C3 so that their cylindrical axes agree with the axial direction of the motor, and so that their cylindrical end portions on their ends at which their positive and negative terminals are provided are positioned towards the side of the power module. By doing this, the wiring between the electrolytic capacitors C2 and C3 and the power module 210 is shortened, so that it is possible to reduce the inductance thereof, and as a result the generation of heat is reduced. Moreover, it becomes possible to reduce the height of the motor control device in the vertical direction, and to make it more compact.

(14) Since the connection portion between the bus-bar 231B of the AC conductor module 231 of the motor control device 200 and the three phase input unit 100T of the motor 100 is electromagnetically and electrostatically shielded by the cover 250M that is made from metal, accordingly it is possible to reduce the radiated noise that is radiated to the exterior from this connection portion. Due to this, it is possible to obtain a control device for an electrically operated power steering system that is compact, and with which the heat dissipation performance is enhanced and the radiated noise is reduced.

The above described embodiments are examples, and various modifications can be made without departing from the scope of the invention.

What is claimed is:

1. A control device for an electrically operated power steering system, comprising:
    a power substrate comprising a plurality of switching elements, that converts DC electrical current to AC electrical current by switching operation of the plurality of switching elements;
    an output terminal for transmitting the AC electrical current to an electric motor that generates steering torque;
    a conductor for electrically connecting the power substrate to the output terminal;
    a metallic chassis that holds the power substrate and the conductor, and supports the output terminal; and
    a metallic cover that faces the output terminal, and that is connected to the metallic chassis.

2. A control device for an electrically operated power steering system according to claim 1, wherein:
    the output terminal is connected by a screw to a terminal of the electric motor; and
    the metallic cover is supported so as to face the output terminal and the screw.

3. A control device for an electrically operated power steering system according to claim 1, wherein:
    the metallic chassis comprises a metallic support portion, for integrally supporting an electric motor side metallic chassis that houses the electric motor; and
    the metallic support portion is formed at a side portion of a connection portion between the metallic cover and the metallic chassis.

4. A control device for an electrically operated power steering system according to claim 1, further comprising:
    a heat dissipation member that is provided upon a one surface of the power substrate opposite from another surface of the power substrate upon which the switching elements are provided, wherein
    the heat dissipation member is provided with heat dissipation fins on an opposite side to a side that contacts the power substrate.

5. A control device for an electrically operated power steering system according to claim 1, further comprising:
    a DC current system conductor unit to which DC electrical current is supplied from a power supply, and that supplies the DC electrical current to the switching elements, wherein
    the DC current system conductor unit is provided at a side portion of the power substrate.

6. A control device for an electrically operated power steering system according to claim 5, wherein
    the DC current system conductor unit is provided at a side portion of the power substrate and on the heat dissipation member.

7. A control device for an electrically operated power steering system according to claim 5, wherein
    the DC current system conductor unit is provided at a side opposite from the metallic support portion, with the power substrate placing between the DC current system conductor unit and the metallic support portion.

8. A control device for an electrically operated power steering system according to claim 6, wherein
    the DC current system conductor unit comprises a first connector for connecting to a battery power supply on a one surface of the DC current system conductor unit opposite from another surface of the DC current system conductor unit that contacts the heat dissipation member.

9. A control device for an electrically operated power steering system according to claim 8, wherein
    the first connector of the DC current system conductor unit is provided more to an exterior than an end portion of the electric motor in its axial direction.

10. A control device for an electrically operated power steering system according to claim 1, further comprising:
    a control board that transmits control signals to the switching elements and controls switching of the switching elements, wherein
    the control board is provided so as to be positioned between the power substrate and the electric motor supported thereat, and is provided so that at least one portion thereof overlaps the DC current system conductor unit.

11. A control device for an electrically operated power steering system according to claim 10, wherein
    the control board comprises, on a surface towards the electric motor, a second connector that inputs and outputs signals from and to the exterior of the control device for an electrically operated power steering system.

12. A control device for an electrically operated power steering system according to claim 11, wherein
    the second connector of the control board is provided more towards the exterior than an end portion of the electric motor in its axial direction.

13. A control device for an electrically operated power steering system according to claim 5, wherein:
    the DC current system conductor unit comprises an electrolytic capacitor for smoothing DC electrical current from the power supply, and a plate shaped conductor that is connected to the electrolytic capacitor; and a plate shaped conductor through which electrical current on a positive electrode side of the electrolytic capacitor flows, and a plate shaped conductor through which electrical current on a negative electrode side of the electrolytic capacitor flows, are provided so as to be overlapped over one another.

14. A control device for an electrically operated power steering system according to claim 13, wherein:
- when the electrolytic capacitor and the plate shaped conductor are connected together, a terminal of the electrolytic capacitor and a projecting portion of the plate shaped conductor are connected together; and
- the terminal of the electrolytic capacitor and the projecting portion of the plate shaped conductor are provided so as to be overlapped over one another, and are connected so that directions of electrical currents that flow therein are mutually opposite.

15. A control device for an electrically operated power steering system according to claim 5, wherein:
- the DC current system conductor unit further comprises an electrolytic capacitor for smoothing the DC electrical current from the power supply;
- the electrolytic capacitor is formed in a cylindrical shape; and
- a central cylindrical axis of the electrolytic capacitor and an axial direction of the electric motor agree with one another, and the electrolytic capacitor is provided so that a cylindrical end portion thereof upon which positive and negative terminals are provided is positioned towards the power substrate.

\* \* \* \* \*